United States Patent
Hayes

(10) Patent No.: US 9,286,942 B1
(45) Date of Patent: Mar. 15, 2016

(54) AUTOMATIC CALCULATION OF DIGITAL MEDIA CONTENT DURATIONS OPTIMIZED FOR OVERLAPPING OR ADJOINED TRANSITIONS

(71) Applicant: Thomas J. Hayes, Westmont, IL (US)

(72) Inventor: Thomas J. Hayes, Westmont, IL (US)

(73) Assignee: CODENTITY, LLC, Westmont, IL (US)

( * ) Notice: Subject to any disclaimer, the term of this patent is extended or adjusted under 35 U.S.C. 154(b) by 387 days.

(21) Appl. No.: 13/680,792

(22) Filed: Nov. 19, 2012

Related U.S. Application Data

(60) Provisional application No. 61/564,148, filed on Nov. 28, 2011.

(51) Int. Cl.
*G06F 17/00* (2006.01)
*G11B 27/038* (2006.01)

(52) U.S. Cl.
CPC .................................. *G11B 27/038* (2013.01)

(58) Field of Classification Search
CPC ........................ G11B 27/038; G06F 17/30761
USPC ............................................................. 700/94
See application file for complete search history.

(56) References Cited

U.S. PATENT DOCUMENTS

| | | | |
|---|---|---|---|
| 6,316,712 B1 * | 11/2001 | Laroche | 84/636 |
| 8,153,882 B2 * | 4/2012 | Adam et al. | 84/627 |
| 8,315,396 B2 * | 11/2012 | Schreiner et al. | 381/20 |
| 8,543,386 B2 * | 9/2013 | Oh et al. | 704/201 |
| 2006/0122839 A1 * | 6/2006 | Wang et al. | 704/273 |
| 2008/0045140 A1 * | 2/2008 | Korhonen | 455/3.06 |
| 2008/0077261 A1 * | 3/2008 | Baudino et al. | 700/94 |
| 2008/0152165 A1 * | 6/2008 | Zacchi | 381/77 |
| 2008/0162668 A1 * | 7/2008 | Miller | 709/219 |
| 2011/0112670 A1 * | 5/2011 | Disch et al. | 700/94 |

OTHER PUBLICATIONS

ProTools 3.2 Manual; c 1996.*

\* cited by examiner

*Primary Examiner* — Paul McCord
(74) *Attorney, Agent, or Firm* — Perkins IP Law Group LLC; Jefferson Perkins

(57) ABSTRACT

A unified digital media player control apparatus automatically reproduces (i.e., renders) gapless transitions, as suitably adjoined or concurrently-overlapping events, between a discrete first media file (e.g., sound recording) and a discrete second media file. One embodiment is implemented on a computing device with a graphical user interface and access to a library of digital media files. Logic can distinguish between the production sound design of recordings which have a desirable "creative content" duration (i.e., interval) that will resolve either abruptly or with a gradual fade. Responsive to media file content assessments, and without operator actions or media file preparation, the invention can use at least one programmatically-addressable event timer object to robotically assign discrete player reproduction timing instructions enabled to cause the system's associated media player objects to consistently interoperate with natural, optimally-timed transitions.

10 Claims, 14 Drawing Sheets

AUTOMATIC CALCULATION OF DIGITAL MEDIA CONTENT DURATIONS OPTIMIZED FOR OVERLAPPING OR ADJOINED TRANSITIONS

BACKGROUND OF THE INVENTION

This disclosure relates to the world of digital media content processing. More particularly, the present invention includes a system and method for improving the concurrent reproduction capabilities of integrated digital media players.

For all but a small minority of marketplace products, digital audio reproduction has replaced its predecessor—analog audio reproduction. This is understandable because music (and all audio production) in digitally recorded form is easier to create, edit, transport, share, deliver, manipulate and preserve.

And yet, with all the apparent advantages provided by the digital media revolution, there is at least one highly-desirable feature that is missing from known media player implementations: the ability for the system, or controlling device, to automatically calculate and execute optimally-timed concurrent (i.e., overlapping) or, where appropriate, adjoined (i.e., closely aligned or abutted) audio transitions.

The present invention has solved that technical challenge, and it is different from the automatic digital media sound mixing and presentation techniques used in the prior art which can generally be classified as examples of two categories: A) expensive software and hardware products marketed to commercial broadcast entities, and B) relatively inexpensive software solutions widely available to a broad spectrum of computing devices, portable music players, and other digital media player capable devices.

For example, in category A, there are broadcast automation products that can perform concurrently overlapping and concurrently adjoined audio output (e.g., music stream) presentations. Well known names include NexGen Digital®, Audio Vault®, iMedia Touch and Enco. However these concurrent overlapping or adjoined media file presentation systems generally need some form of administrative preparation. In other words, these products do not automatically calculate each media file's optimum creative content duration.

For instance, in these professional-grade products, the database record connected with each song's media file must somehow contain a user submitted value, or user action-extrapolated value, that designates the desired duration for the creative content portion of each song. Tracks (i.e., audio files) in these systems may need an associated data file that stores their key timing information, and the data file is generally created when a user takes some type of action related to the timing specification for each system media file.

Such elaborate automation software may include other methods of song-specific timing designation. Administrative users might be required to insert digital markers that specify where a song should end, or where a fade should begin, in order to trigger the next play event. In some cases, the software may permit the administrative user to arrange sequential waveforms in an overlapping manner to "fine-tune" the transition, but this also mandates user intervention. In other scenarios, the desired duration is programmed as a byproduct of the media file upload process with the audible duration determined when the operator decides to fade or conclude a song via user interface or hardware controls.

Consequently, all known implementations require some form of administrative (i.e., operator) intervention in order to determine the specified content duration of each media file included in a transition. This means that professional-grade mixing (i.e., media file transition) designs can only provide fully automated transitions after an optimal duration (i.e., reproduction interval) is evaluated for, and specifically assigned to, each concerned media file.

Obviously, preparing thousands of digital audio media files for compatibility with such a system would be a labor-intensive task. Therefore, these types of broadcast automation implementations are not truly "automatic" because they cannot create optimally-timed transitions without first requiring some degree of user intervention. This is different from improvements in the disclosed invention which calculate and execute optimally-timed transitions with no user intervention, and do not require media file preparation for compatibility with the system.

An explanation of an automatically implemented "cross fade" transition will be essential to the reader's understanding of the improvements the invention provides over the prior art. The cross fade is a transition technique widely available in as many as fifty digital media file mixing products—marketed in the form of software, hardware, or a combination of software and hardware products; and forms possibly including integrated logic circuits. Many or most of these mixing solutions use technology furnished and owned by two prominent software developers—Microsoft® Corporation and Apple®, Inc.

The following description demonstrates how Microsoft publicly defines its media player cross fade feature:

"Create smooth transitions between songs with crossfading. With Windows Media Player, you can create gradual transitions between songs in your playlists by turning on crossfading. When you do so, the volume at the end of one song fades out and gradually goes down while the volume of the next song fades in and gradually goes up. Crossfading is available only when you play Windows Media Audio (WMA) or MP3 files that are either in your library or on a data or HighMAT CD. Crossfading is not available with audio CDs."

Source: This instructional excerpt was retrieved as part of a research endeavor by the inventor which located the information in July of 2011 at this Microsoft Web address: http://windows.microsoft.com/en-US/windows-vista/Create-smooth-transitions-between-songs-with-crossfading(.)

Digital media file cross fades (or, in Microsoft parlance, "crossfading") are explained generally as a fade out of one song, and a fade in of the next song. Evaluation of the Microsoft technology, using an assortment of pop music digital media files, has demonstrated that their description is accurate.

Unfortunately, a cross fade does not typically present the media file creative content in the manner conceived and recorded by the original artists. We know this to be true because while many, but not all, songs (i.e., recordings) are produced with a gradual fade ending, almost no songs are produced with a starting audio section that gradually fades in. (One well-known exception can be recognized by listening to the 1964 Beatles recording entitled "Eight Days A Week". However such exceptions are rare.)

Therefore, it may certainly be logical to conclude that automatic software-executed cross fades, while interesting in cases where they may serve to reduce the audible gap between consecutive media file reproduction, are not fully faithful to the sound design implementation of their corresponding artists. In that sense, this type of digital media file cross fade implementations may be considered as contributing to or producing an unnatural transition. As will be explained, the present invention utilizes either overlapping transitions, or adjoined transitions, in order to overcome the limitations of cross fade technology in the prior art.

With regard to category B prior art in the form of so-called "automix" (i.e., automatic mixing) implementations usually configured for distribution to consumer and "prosumer" markets, and including computing-device enabled media players or "digital DJ" style media player applications (i.e., software products), all known solutions implement media file transitions with varying degrees of a "cross fade" (i.e., the gradual fade out of the audio level for a first media file, followed closely by the gradual fade in of the audio level for a second media file). Additionally, adjoined presentation for content that ends cold (i.e., abruptly) and starts cold is increasingly problematic. DSP (digital signal processing) cross fade performance will vary depending on the sound design of the content. During automix cross fade executions, different solutions from different vendors provide less than ideal conformity with the artistic intent of the digital media file audio creator.

For instance, most popular music recordings are not designed and recorded to start with a gradual audio level increase (i.e., fade in). And many popular music recordings are deliberately recorded with a cold (i.e., abrupt) ending on a music note or with a sustained vocal heard at full audio level. Artists who have designed their audio content to end cold did not conceive of its presentation as concluding with a premature level reduction (i.e., early fade out). Therefore, forced "fade outs" and unintended "fade ins" make unnatural changes to the artistic intent of the music creator. This fade out then fade in effect is particularly undesirable for presentation of adjoined audio recordings where a first media file ends cold and a second media file starts cold.

But, in every evaluated automix-style implementation, cross fade transitions were not able to produce concurrently overlapping media file transitions. Instead, automatically executed cross fade transition products typically create an unnatural "V-notch" effect (i.e., fade down, then fade up) in the audio levels of consecutively presented (i.e., reproduced as in rendered) media files. This means that most transition instances created with cross fade automix implementations tend to cause a premature fade (i.e., gradual level reduction) of the first media file, while also causing an unnatural fade in (i.e., gradual level increase) of the second media file.

Commonly available automix cross fade transition solutions are executed within a single media player object (i.e., as a software instantiated media player or perhaps as a hardware device) by a mechanism that utilizes DSP (digital signal processing). DSP analyzes physical properties of each song (i.e., media file recording embodiment) such as, for example, a waveform, and combines or establishes interval of content boundaries from each discrete media file; and then determines a projected transition point that is located at or near the end of a first media file, while also at or near the start of a second media file.

These DSP cross fade implementations almost always produce the aforementioned undesirable level dip effects. Further, since most DSP-controlled automatic transitions execute utilizing a playlist contained in one media player with the intervals of the concerned first media and second media files calculated by a processor, the transitions are encumbered with a processing overhead factor. This means the transition point execution is achieved after a requirement for considerable CPU cycles and computation time, and as a result, last second media file substitutions are not possible.

For example, utilizing an automix-style DSP mode (which is generally a user-activated optional feature), if a user chooses to manually activate the next transition event, the audio output of the first media file will immediately stop, and the audio output of the second media file will start. With this design, the transition is abrupt because there is no fading or blending of any kind. This is different from the disclosed invention which permits activation of manual transitions while not "dumping" (i.e., truncating) reproduction of the first media file. Instead, the systems and methods of the present invention preserve and execute blended fade effects in both automated and manually activated transitions.

Additionally, DSP transitions that are executed utilizing the playlist content of one media player require the process to have an awareness of certain properties of each media file. In other words, with DSP, the media files are linked by an evaluation process. This is different from the present invention where media files are retrieved from an independent playlist container object, and then reproduced in independent media players that require no awareness or evaluation of any other player's content.

It is true that there are many digital DJ style music mixing products that offer concurrently overlapping or concurrently adjoined song (i.e., media file) transitions, however to provide concurrently overlapping or concurrently adjoined transitions these products require a human operator to manually determine when to initiate the changeover from a first media file to a second media file, and then to manually activate the transition. Most of these manually triggered implementations also incorporate an optional form of so-called automatic DSP cross fade transition capability, but it has the limitations identified in the previous paragraphs.

SUMMARY OF THE INVENTION

According to one aspect of the invention, a plan is provided for devising a processor and system including a computer-readable medium encoding a computer program product (i.e., an application) which includes or permits access to a locally-stored, or network accessible, or Satellite accessible, or Web-accessible database (or collection) of digital audio media file (DAMF) content. The DAMF content can include, but is not limited to, popular music recordings, sound effects, advertising productions, radio station promotional jingles, and spoken word recordings).

In one implementation, the application is graphical user interface enabled to cause the processor to perform operations including: retrieving media file content from a database or media file collection, displaying each file's corresponding key data attributes to the user, and, as a sub step, loading (i.e., inserting) media files into one or more media players, responsive to ad-hoc user selections or playlist (i.e., designated media file collection) summaries.

One aspect of the preferred embodiment includes an application sub system capable of automatically calculating digital media file durations based on determining the estimated interval of their creative content (which is generally different from the total file duration). Utilizing the calculated durations, the system and methods then use the native functionality of a programmatically-addressable play event timer object. The play event timer's interval property is instructed to further activate and control program structures that enable presentation (i.e., reproduction) of successive media file audio streams (i.e., media player sound output) as either optimally-timed overlapping transitions, or optimally-timed adjoined transitions. The transitions include a first media file in a first media player (i.e., a software instantiated object), and a second media file in a second media player, where each transition presents, at desirable audio levels, only the suitable creative content section of each media file.

Accordingly, in the present invention, among other things, a system and method for creating a unified media player controller mechanism which is capable of producing automatically-calculated, optimally-timed, concurrently overlapping media file transitions will be disclosed. The invention will also enable automatically-calculated, optimally-timed concurrently adjoined media file transitions. Based in part on recognition of each media file's specific production sound design, the invention will automatically determine whether to execute a concurrently overlapped or a concurrently adjoined transition between any two digital media files (e.g., between a discrete first media file and a discrete second media file).

In the preferred embodiment of the present invention, metadata, waveform characteristics, musical styles, volume levels, header data, aggregated timelines, and various other properties of each concerned media file are not analyzed. Instead, an automated media file duration computation and execution system has been created utilizing, among other things: one measured media file property (the duration-String), a series of program structures, and computation formulas based in part on characteristics common to digital media audio files.

The term "metadata" above refers to descriptive data identifying attributes of individual media files. Metadata tags are commonly used by some media player devices or programs, but the preferred embodiment of the present invention relies instead on other techniques including database-supplied file attribute data.

Unlike other digital media file transition and mixing systems that compare aspects of consecutively presented (i.e. reproduced) media files in order to compute and simulate a desirable transition point, aspects of the invention disclose techniques which independently determine and apply media file duration instructions on demand (i.e., with no processing delay), and those instructions are not directly concerned with the existence of any other media file or media player or the associated properties of any other media file or media player.

In the preferred embodiment, the full and precise duration (i.e., interval) of each discrete (i.e., individual and unique) media file is measured (i.e., determined) by program instructions that retrieve the media file's duration property value once the file has begun to play in a media player (and using the syntax: player.currentMedia.durationString). Also, a manually-set and field-stored database record attribute consisting of a Boolean (i.e., true or false) value is utilized to pre-classify a media file as having a production sound design which resolves with either a fade (i.e., gradual) end or cold (i.e., abrupt) end style.

Alternative embodiments can be envisioned where a different method of determining a full and precise duration does not first require the media file to begin playing in a media player, and the media file's end style classification could be determined by, for example, waveform analysis (at the cost of longer computing cycles and potential execution latency).

Referring now to the automatic media file calculation aspect of the invention, after completing human observational research with a control group of approximately 2,000 discrete digital audio media files, evaluation of the data demonstrated that the composition of a typical digital audio media file (DAMF) included its artistic content plus an average of about 5 seconds of silence—placed at the end of the file. Therefore, almost every DAMF is produced with a "first section" interval which is a creative content (i.e., creative artistry) section, and an appended "second section" interval which is generally comprised of inaudible silence (i.e., a silence suffix). As a result, the entire duration (i.e., full length) of almost every DAMF will include a first section interval of audio intended for reproduction and presentation to the listener, and a second section interval of inaudible silence that continues after the conclusion of the first interval, and as such, is not intended for presentation to the listener.

As a practical consequence, in the invention, a duration computation formula interval estimate (i.e., offset value) that generally coincides with the average interval of the silence suffix segment (i.e., second section) of a media file is computed and subtracted from each media file's system-measured duration (i.e., the total or full length as comprised by the interval sum of the first creative content section and the second silence suffix section). This allows the system to reliably recognize the probable length of the creative content section of each media file. To function accurately, the system is been designed to distinguish between a sound design that finishes with a fading (i.e., gradual level reduction) style or a cold (i.e., abrupt level reduction) style (in order to apply a suitable silence suffix offset value).

The classification of the fade end vs. cold end style is a key aspect of the invention's media file duration formula. In the real world, if each DAMF has an appended second section interval of about 5 seconds, then subtracting, for instance from a first media file having a cold end, a pre-determined value of 5 seconds from its full length would likely result in a very accurate calculation of that media file's first section interval—the creative content section. The invention practices this method and, in a separate step, the computed interval (known as the calculated duration) is assigned to a play event timer that programmatically controls reproduction of the first media file, and then begins a transition event when the play event timer has counted down to zero (and, in the preferred embodiment, this zero state is programmatically read from the play event timer's "timer interval" property). At that moment (i.e., the point at which the timer interval is zero), reproduction of the first section of a second media file in a second media player is programmed to audibly adjoin the conclusion of the first section of a first media file having a cold ending production design. FIG. 12 depicts a calculated duration transition for a cold end first media file audio stream which is presented by the system as concurrently adjoined to the first section audio stream of a second media file.

However, in a different media file scenario, if an appended second section interval of about 5 seconds was subtracted from a first media file having a fade end, with the gradual audio level reduction transpiring, for instance, over a period of 10 seconds, a different and undesirable outcome can be anticipated. This can be understood by looking at the composition of the last 10 seconds of the fading media file, and the final 5 seconds of its silence suffix. Subtracting only 5 seconds to compensate for the first media file's second section interval of silence would calculate a media file duration equivalent to the length of the file's first section content interval and, consequently, a play event timer transition would occur at a point where the audible creative content of the first media file had ended (and its second section of silence had begun). This would preclude the possibility of a concurrently audible overlapping transition between the creative content sections of the first and second media files.

In practice, the present invention solves the technical challenge presented by this example scenario. Whenever the invention recognizes a first media file as having a fade end, it applies a different pre-determined fade end offset interval (such as 10 seconds instead of 5 seconds). Because more time is subtracted from the full length (i.e., measured duration) of the media file, the calculated duration assigned to start a play event timer is shorter. Consequently, in this example, the first section of a second media file is heard to start playing and concurrently overlap the fading first section of a first media file. FIG. 11 depicts a calculated duration transition for a fade end first media file audio stream which is presented by the system as concurrently overlapping the first section audio stream of a second media file.

Therefore, using techniques that enable concurrent overlapping or adjoined media file reproduction with a plurality of media player audio output streams, the system and methods of the present invention automatically (i.e., robotically) and persistently determine, assign, execute and control an optimum (or near optimum) creative content interval (i.e., calculated duration) value for each system-reproduced media file. This capability is claimed for the invention.

The system and methods of the invention are scalable, and can be configured to incorporate, for example in the preferred embodiment, as few as two independent media players (i.e., digital media file player device implementations). Or, in alternative embodiments, a plurality of media players potentially comprised of three, four, five, six, or more instantiations is possible. Additionally, the disclosure envisions compatibility with multiple digital media file formats, and locally-stored or remotely accessed digital audio media files, in a range of selections comprising from as few as two, to an almost limitless number of discrete media files numbering in the hundreds, thousands, or more.

It can be envisioned that, instead of at least two media player instantiations, advanced multi-channel sound card circuits, which can process or buffer media file audio streams, might be used to practice the invention in an alternate embodiment. However, this would raise the cost of implementation because the preferred embodiment is implemented with standard inexpensive stereo sound card (i.e., digital to analog conversion circuit) capabilities common to computing devices.

Also, one aspect of the invention teaches an ability to automatically or manually control music flow (i.e., media file selections) based on media file attribute playlists which are instantiated and stored in an independent playlist container, where the playlist container is not a component of (i.e., not coupled with) any media player. In the preferred embodiment, the playlist container is a part of the integrated database in the application. However, a playlist container, or its counterpart, accessed from a local or remote processor or storage device, wireless device, mobile device, satellite delivery system, or Web-enabled system, can also be envisioned.

Therefore, one aspect of one embodiment of the invention discloses the first digital media file delivery system to devise a formula that permits: automatically-calculated and optimally-timed reproduction for the creative content of concurrent overlapping audio streams or, when appropriate, concurrently adjoined audio streams; where the invention incorporates techniques including human-classification of deduced media file attributes, program retrieved media file properties, mathematically computed comparisons of the obvious and non-obvious media file content intervals contained in each discrete media file, and playback execution directed to occur from a plurality of independent media players.

These capabilities permit the systems and methods of the invention to reliably execute an automated or manually activated series of aesthetically pleasing media file transitions; where each transition preserves the artist's sound design intentions (with respect to timing and audio levels), while at the same time having no requirement for user intervention (i.e., preparation) or digital signal processing overhead.

Broad sections of computing device, professional and consumer electronics, and software markets will benefit from the improvements disclosed by the invention. Such sectors include, but are not limited to, personal computing, portable music players, tablet devices, mobile smartphone devices, and music broadcasting operations. Most of these product sectors already incorporate some form of digital media player capabilities in their products.

The preferred embodiment does not require techniques like waveform analysis or digital audio processing, media player extrapolated metadata analysis, or any human executed collaboration tasks like discrete media file editing or direct data entry. This means that one aspect of the invention, in its default state, enables automatic time-controlled calculations with near zero processing overhead, while requiring no form of user intervention for media file duration assignments.

Additionally, the invention does not load and enable overlapping or adjoined audio reproduction in conjunction with any master timeline (like that common to audio or video editing programs). Instead the methods of the invention permit each discrete media player object (i.e., media player) to reproduce media files according to its self-contained or device-implemented timeline control (where each player's timeline control is not solely responsible for determining the duration of its playing content because a system applied duration will control play time).

In the example of the preferred embodiment, each independent media player timeline control will be activated when the system starts a controlled player. When the system transitions to a different media player, system logic can be invoked to cause the audio level of the preceding player to fade out, but the position (i.e., elapsed duration mark) of the preceding timeline control is not modified by the transition logic. However, other implementations can be envisioned that permit the transition logic to modify a player's timeline control position.

For example, a developer may wish to add a timeline reset command to the invention's transition logic. This sort of instruction might automatically return the timeline control position of the preceding player to the first frame (i.e., incremental interval) of audio, while also muting and perhaps stopping the preceding player. Such functional modifications are obvious, and should not be permitted to constitute an unforeseen improvement over the systems and methods of the invention.

Another aspect of the invention concerns an independent playlist container object. The preferred embodiment of the present invention instantiates a playlist container software object. The playlist container is capable of storing key data attribute values (such as title, artist, tempo, hyperlink path, etc.) for one or more media files (i.e., audio recordings). The playlist container is an independent object, and not maintained in, or directly manipulated by, any media player object (i.e., media player). In the preferred embodiment, the playlist container does not harvest (i.e., retrieve) common metadata from media files or media players. Instead, the playlist container accesses (i.e., retrieves as needed) key data attributes for media files from the media file's associated database record. The playlist container object has additional functionality, and much of it will be described in the appropriate sections of the detailed description.

The invention manages media file manipulation (i.e., reproduction, audio levels, and timing, etc.) according to a set of rules envisioned for the application. For example, using application search and filter controls, certain songs and associated key data attributes (such as artist, tempo, decade of release, etc.) can be identified, displayed, and selected for playback. At play time, programming instructions use the hyperlink path statement (sometimes called a URL) associated with a particular media file, and therefore connected with a specific database title content, to enable the system to load (i.e., insert) the media file into a media player.

It should be noted that the connection of a hyperlink path with the default load and play behavior of a media player object is not a claimed aspect of this invention. The ability of a media player object (like the Microsoft® ActiveX® media player objects used in the preferred embodiment) to accept and interpret load and play programming instructions is common to many software products.

However, unlike other media player products, the preferred embodiment of the present invention retains a collection of playlist titles (i.e., media file data including hyperlink path statements) in the playlist container, and does not concurrently load a plurality of media files into any player. Therefore, in the invention, after the media file in an assigned player has been played, it will be replaced by the player's next inserted media file. In cases where the user (i.e., operator) decides to substitute a second media file in the place of a loaded first media file, the system permits player content modification via manual or automatic selections.

The preferred embodiment uses the computing device's processing capability to implement instructions that load a single playlist container media file (via hyperlink connection) into a player at the moment a play (i.e., reproduce) command or play next command for that file is activated, and not before its play or play next command is activated. However, other embodiments that bypass a playlist container object and directly load a media file can be envisioned. It also is conceivable that alternative embodiments, if carefully implemented, might seek to load a media file into a media player before a play or play next command is initiated. In some embodiments, a designer may choose to combine the functionality of the play button and the play next button utilized by the preferred embodiment. Such alternative example decisions, made at the developer's prerogative, should not be interpreted as obscuring or invalidating the inventive effectiveness of the techniques disclosed by the invention.

But, in the preferred embodiment, the UI (user interface) play command, or play next command, is triggered automatically by programming logic, or manually after receiving a pointing device click-command from the user. Alternatively, an implementation may also choose to accept user commands from keyboard input, touch-interface gestures and actions, or some other bio feedback-enabled mechanism such as motion-sensor interactions, voice commands, fingerprint scans, analysis of human digit body temperature or screen proximity, eye-movement tracking interpretations, or sensor-coupled breath capture straws. Accordingly, in the preferred embodiment, play and transition event instructions are connected with an independent play button (i.e., command control object) or an independent play next button (i.e., command control object) which have been created for the system; command buttons which are not any media player's default command buttons.

As an example of automatic (i.e., system initiated, and not user initiated) play next transition control implemented in the preferred embodiment, consider that skilled Microsoft VBA programmers will understand that play or play next instructions can be assigned to the "Got Focus" event of an application created control object. And, for example, an internal program timer object can be set to trigger a GotFocus event. In such cases, when the application detects circumstances that cause execution of the GotFocus event, the program can be instructed to begin a variety of tasks comprising such operations as: retrieving music track (i.e., media file) attribute information from a playlist (such as may be accessible for a playlist container); executing a typical insert and load hyperlink command and directing the associated media file to a specific media player; directing the media player to begin reproduction (i.e., file play), and to start play at a pre-determined level; invoking an automatic fade instruction to cause level reduction for a preceding media file; and updating the UI to display attribute data associated with the media files involved in the transition or anticipated transitions.

Functionality controlled or initiated by a program's GotFocus event in this example is not restricted to the operations (i.e., programmed instructions) listed here. An almost endless variation of operations, calculations and evaluations can be connected with a GotFocus event. The next paragraph describes a multi-step operation which is enabled by the invention.

Further, and to demonstrate application of the systems and methods disclosed by the invention, instructions can be attached to or initiated by a GotFocus event that will: a.) Measure (i.e., calculate) the total duration of the media file assigned for playback, b.) Recognize the file's end style (such as fade or abrupt), c.) Estimate the probable duration of its creative content section by subtracting a predetermined interval of silence from the total measured duration and, d.) Having the creative content section interval available to the program instructions, transfer (i.e., assign) that creative content interval value to a play event timer (i.e., internal program countdown clock) that can be used to optimally control the play duration of the associated media file and then, e.) Initiate countdown of that play event timer and, f.) As a practical consequence, when the play event timer reaches zero, enable program recognition of that play event timer interval zero state to automatically cause the next transition to begin.

These transition techniques are utilized in the example of the preferred embodiment of the present invention, and therefore media file reproduction and manipulation (such as start times and audio levels) is enabled with methods that provide independent operations coordinated by the system. This means that, in this aspect of the invention, discrete media files, and discrete media players, are not directly concerned with the existence or property states of any other media file or media player.

Accordingly, when executing an overlapping or adjoined transition in the invention, no media file property is dependent on the property of any other media file; and no media player is dependent on a property or control state of any other media player, and no media file output stream (i.e., the audio content) is dependent on a property or state of any other media file output stream. This is different from implementations offered by DSP (digital signal processing) systems that seek to compare, and then optionally combine or present, the output streams of a first and second media file in order to produce transition reproduction by a single player object.

Trained programmers will understand that the scope, structure, and intent of potential programming instructions for a control's GotFocus event is not limited to the examples specified here. A VBA GotFocus event is utilized in the preferred embodiment; however other implementations that initiate playback and transitions with different methods can be envisioned.

Continuing with a summary of the invention, in one implementation, the preferred embodiment, a first play button, labeled PLAY, is used to initiate playback of a first media file from the playlist container. The first play button inserts a first media file into Player 1, and begins reproduction in Player 1. Reproduction operations in the media player cause the audio output of the player's music stream to be transmitted to a standard "sound card" (i.e., digital to analog conversion circuitry) usually configured as a component of the connected processor. The output of the sound card can be connected to powered loudspeakers, headphones, or some other apparatus like a mixing console or recording device.

Referring again to the preferred embodiment, a second play button, labeled PLAY NEXT, initiates the transition process between the currently playing media file and the next playing media file. Whenever PLAY NEXT is activated, the system logic retrieves a stored value from a hidden LPS (last player started) control. The play next transition process in the invention is part of a "chain reaction" (i.e., connected and systematically executed) design that enables automatic and optimally-timed transitions. The play next transition process has been described in step by step detail as one embodiment example in the above paragraphs, and it can also be understood by reading the detailed description of the invention.

In this two player embodiment example, if Player 1 is identified by the system as the LPS, (last player started), the next selection, a second media file, will be routed to Player 2. Conversely, if Player 2 is recognized as the LPS, the next media file selection, which could be a third, fifth, seventh, or other media file, will be routed to Player 1. In this manner, the system manages playback assignment—alternating reproduction between two discrete players, each player having an independent audio stream output, with the output configurable for presentation as part of the previously described overlapping or adjoined transition styles.

In the preferred embodiment, Player 1 always receives and plays songs (i.e., media files) stored at odd-numbered positions in the playlist container (such as 5, 7, 3, 19, etc.); and the Player 2 always receives and plays songs stored at even-numbered positions in the playlist container (such as 10, 12, 16, 4 etc.).

The methodology in the present invention differs from automatic media player designs which accept and store a playlist as a plurality of loaded media files in a single media player object.

For purposes of clarification, in this specification, the creative content, or "creative artistry", section is defined as the media file segment comprised of music, vocals and effects performed by the associated artist. The silence, or "silence suffix", section is defined as the media file segment comprised of quiet (i.e., no music, vocals or effects).

It should also be understood that the natural conclusion of a digital audio media file is defined as the point in time during its reproduction that coincides with the productive end of the creative content section.

The productive end of a song which concludes with a "fade" (i.e., gradual level reduction) will likely occur at a moment approximately several seconds after the fade has been started, and also before the volume is so low that a significant audio level reduction is noticeable by the user. The productive end of a song which concludes "cold" (i.e., at full or near full audio level) will likely occur at a moment coinciding with the last full or near full volume portion of its vocalization, musical note, or effect.

While almost all digital audio files are comprised of a creative artistry segment and a silence suffix segment, the natural conclusion of each discrete digital audio file will have one of two different end styles: FADE or COLD. Fade endings can be quick (occurring in 2 or 3 seconds) or slow (transpiring over 5 to 10 seconds or longer). Cold endings can be very cold (ending abruptly with a vocal word or a quick musical note) or cold sustained (taking longer to complete with the vocal phrase or the musical note held for several seconds.)

Further, it should be known that digital media files, which in some cases are also the digital format embodiment of analog-audio recordings, will have a start style which can be categorized as "cold" or "non-cold". Recordings that begin with an artist vocalization at first audio are deemed to be COLD start songs. Recordings that begin instead with musical instrumentation or effects at first audio are categorized as NON-COLD start songs.

In one aspect of the invention, a method for automatically calculating an optimal reproduction duration for discrete media files is used to enable the presentation of concurrent overlapping or sequentially adjoined audio streams. According to the method, a first media file with a first beginning and a first end is selected. A first play event of the first media file is started on a first media player. The method determines the full length of the first media file, the first media file having first and second sections. The method automatically calculates a first section event time. To do this, the method determines whether the audible production sound design ends with an abrupt or a gradual level reduction. A second section interval, which can be equal either to a first predetermined interval for an abrupt ending sound design or a second predetermined interval for a gradual ending sound design, is subtracted from the first media file full length. A first section event time in the first media file is assigned to a play event timer. At the time of this assignment, a countdown process is initiated for the play event timer. When the play event timer reaches zero, a second media file, with a second beginning and a second end, is selected. A second play event of the second media file is started on a second media player. As a result, either the first section of the second media file is heard to audibly enjoin the abrupt end of the first media file, or the first section of the second media file is heard to audibly overlap the fading end of the first section of the first media file.

In the preferred embodiment of the present invention, the automatic calculation of media file durations and the execution of concurrently overlapping or adjoined transition events is implemented by technology that can:

a.) Accept assignment of discrete digital media files from a preassembled playlist (i.e., a collection of specified songs) or an ad-hoc (i.e., improvised) selection process;

b.) Distinguish between a fade ending or cold ending for each digital media file in order to include time compensation (i.e., interval) adjustments suitable for each media file's natural conclusion style;

c.) Load (i.e., insert) and start playback of a first media file at its default (or preprogrammed) audio level (i.e., volume);

d.) Recognize a moment (i.e., point in time) that coincides with the natural conclusion of the creative content section of the first media file, and then, at that same moment, load and start playback of a second media file at its default (or programmed) audio level;

e.) At a moment coinciding with the start of the second media file, begin a fade process for the preceding first media file until its audio level is zero;

f.) Recognize a moment that coincides with the natural conclusion of the creative content section of the second media file, and then, at that same moment, load and start playback of a third media file at its default (or programmed) audio level;

g.) At a moment coinciding with the start of the third media file, begin a fade process for the preceding second media file until its audio level is zero;

h.) Recognize a moment in time that coincides with the natural conclusion of the creative content section of the third media file, and then, at that same moment, load and start playback of a fourth media file at its default (or programmed) audio level;

i.) At a moment coinciding with the start of the fourth media file, begin a fade process for the preceding third media file until its audio level is zero;

j.) Continue with the process as described until the playlist or ad-hoc selections are exhausted;

k.) Execute the stated transition styles and transition events objective as part of an automated (i.e., robotic) process or with a manually activated UI command (at the operator's discretion);

In the preferred embodiment, this process has been described for implementation with a minimum of two independent media player objects (i.e., instantiated media players), each with independent volume level and play (i.e., start) controls that can be programmatically addressed by the system. Therefore the preferred embodiment will demonstrate the system controlling timing and levels for two independent music streams.

In the preferred implementation, music track (i.e., media file) flow is determined by player rules processing logic that is capable of executing automated or manually activated overlapping or adjoined transitions, which include optimally-timed and automatically calculated media file durations. To provide an extremely fluid music track flow, which permits last second changes, the system retrieves media file attribute information (such as hyperlink path, title, artist, tempo, etc.) from the playlist container and routes media file reproduction to an available (i.e., system instantiated) player object.

With regard to an aspect of the playlist container, media file transitions will always occur between discrete media files; but instead of enforcing transitions limited to a media file i.e., (song) from playlist position 1 to playlist position 2 to playlist position 3, the selected files may be retrieved from playlist position 1, then playlist position 7, then playlist position 4, then playlist position 11, and so on. Therefore, the implementation of standard order (such as 1, 2, 3, 4, 5, etc.), or non-standard order (such as 1, 6, 5, 12, 23, etc.) can be invoked by the system or the user.

The invention permits transitions between a first and second instance of the same discrete media file, however this eventuality will probably be rare. Also, the preferred embodiment permits the user to temporarily cancel the application of a fade command for the concluding media file at the start of a play event for the next media file. Alternative embodiments not limited to two media players can be envisioned. Other embodiments can also be envisioned, and different iterations will be cited elsewhere in this specification.

In the system, when the first digital media file is commanded to start playback (reproduction), a play event timer will simultaneously begin a countdown to zero—using the system-assigned duration. This aspect is described in great detail for the description of FIGS. 8, 9 and 10. When the play event timer reaches zero (i.e., the moment when the computed audible reproduction duration has fully elapsed), the system will programmatically start concurrent reproduction of a second digital media file. Further, the computation of the first digital media file's "creative content" interval (i.e., a first section and also the calculated duration) will be executed with a calculated duration formula that is formed and applied based on the file's "end style" (as fade or cold). This is accomplished in order to subtract a predetermined "silence suffix" interval (i.e., a second section) from the full length of the first media file.

For example, if a certain song (i.e., music recording) is measured by the system and determined to be precisely 180,000 milliseconds (or 3 minutes), and the interface-selected and applied "duration silence offset" value is 10,000 milliseconds (10 seconds), the invention's mathematical formula would subtract 10,000 milliseconds from the measured duration of 180,000 milliseconds. This equation would next assign a play event timer duration of 170,000 milliseconds (2 minutes and 50 seconds) for song reproduction. If the play event timer countdown is concurrently started with the reproduction of the associated media file, the play event timer interval property will reach zero (after the specified 170,000 milliseconds has elapsed) at a moment that coincides with the calculated creative content duration of the media file. This play event timer interval zero property is recognized and then used to activate commands that instruct the system to start the next audio play event.

The practical consequence of such a "duration silence offset" computation produces a running time (i.e., effective duration) that can accurately approximate the interval of the recorded media file that is comprised of the "creative artistry" portion of the recording, thereby removing the possibility that the system will permit reproduction of the silence suffix section at the end of the file.

In this embodiment, the system accepts user specified song selections from an independent playlist container. The system will consistently alternate reproduction of a first media file from a first media player (Player 1) to a second media file from a second media player (Player 2), and continue with reproduction of a third media file from Player 1, followed by reproduction of a fourth media file from Player 2, and so on until the playlist is exhausted.

While the preferred embodiment will describe a system with two independent players, it should be understood that the invention is not restricted to only two media players. Using the techniques disclosed, it a skilled programmer can create systems that include three, four, five, six, seven, eight, or more players.

Aspects of the present invention overcome the known limitations of prior art including the inability to provide automatically calculated, and optimally-timed, concurrently overlapping or adjoined media file transitions.

For at least the stated reasons put forth in the paragraphs above and in the background section, the technology in the present invention provides a profound improvement in the state of the art for both consumer-oriented media players and media player capable devices, as well as for implementations envisioned for broadcast application scenarios.

The details of one or more implementations are set forth in the accompanying drawings and the description below. Other features, aspects, and advantages will be apparent from the description and drawings, and from the claims.

DETAILED DESCRIPTION

Among other things, techniques and systems are disclosed for improving implementation of the concurrent reproduction (i.e., sound rendering and mixing) capabilities of digital media players. In the following description, numerous specific details are set forth. However, embodiments of the invention may be practiced without these specific details. In other instances, well-known circuits, structures, and techniques have not been shown in detail in order not to obscure the understanding of this description.

In this specification, one embodiment, the preferred embodiment, will be described for a Microsoft® Windows® operating system (OS) computing device. The preferred embodiment is a computer program application powered by the Microsoft Access™ database program, which also provided the development interface. The embodiment was created primarily using Microsoft Visual Basic® for Applications (VBA). Additionally, some programming instructions were written in SQL (structured query language), Microsoft's Windows Scripting Runtime language, and with references to the Microsoft Windows API (Application Programming Interface).

In order to manipulate an assortment of visible and hidden programming objects, controls and structures, and their corresponding numeric values or property states, program variables were created and utilized. Finally, mathematical equations, formed from a combination of variables and assigned or assessed numeric values, were utilized to implement the various timing calculations enabled by the system.

In the preferred embodiment, the automatic media file duration calculation aspect is implemented as an application sub system which is integrated within a larger container application. The container application includes computer program instructions, data sets, and other objects that are utilized by the invention and are essential for one embodiment of the invention's operation. As noted, since not every aspect of the container application in the preferred embodiment will be claimed as part of the invention, various elements of the container application may not be described in exhaustive detail. This is true for aspects of the container application that are commonly known to skilled practitioners such as computer program developers and electronic engineers. When necessary to clarify the functionality of the invention, certain components of the container application will be examined.

Figure 1:
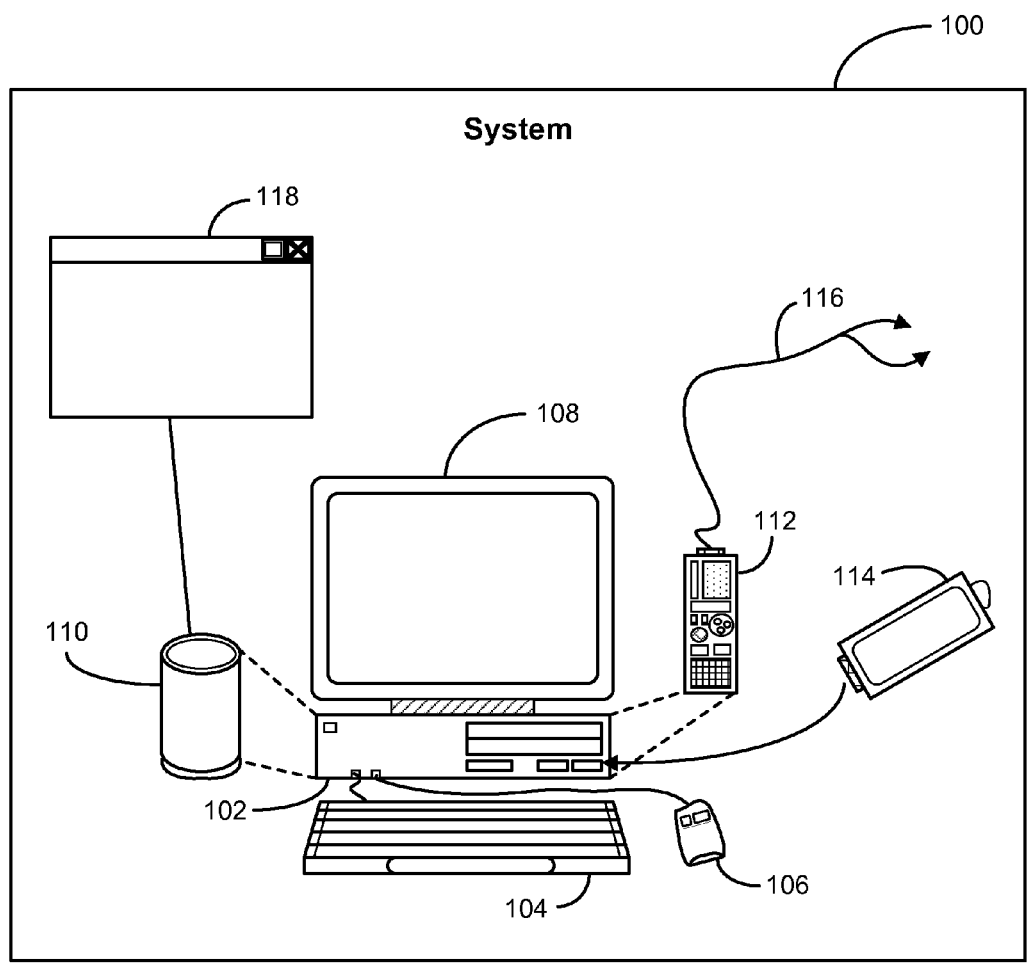
FIG. 1 is a schematic of an example of a system for implementing a controlling process to automatically calculate and execute concurrent and optimally-timed overlapping or adjoined audio transitions in a plurality of digital media players.

Further aspects of the invention and their advantages can be discerned in the following detailed description, in which like characters denote like parts and in which:

FIG. 1 is a schematic of an example of a system 100 for implementing a controlling process to automatically calculate and execute concurrent and optimally-timed overlapping or adjoined audio transitions in a plurality of digital media players. The system 100 includes a data processing apparatus 102 including a processor with connected memory, and other typical computer system components, communicatively connected to a primary data storage device 110. The primary data storage device 110, or an optional data storage device 114, or both, is configured to store digital media files. A processor coupled to the data processing 102 apparatus, and a storage device, is configured to locate and enable reproduction of digital media files through an application 118 embodiment or other media player device.

Continuing with FIG. 1 where the system 100 also includes an input device 104, a pointing device 106, a display device 108, and an output device 112. The output device 112 is a Windows® PC standard "sound card" (i.e., digital to analog conversion circuitry) which can be further connected to audio output cables 116 configured for optional connection with powered loudspeakers. In the system 100, an optional flash memory device 114 is depicted as configurable for connection with the data processing apparatus 102. Also illustrated is a computer encoded program product—an application—118 containing instructions operable to implementing the invention.

Figure 2:
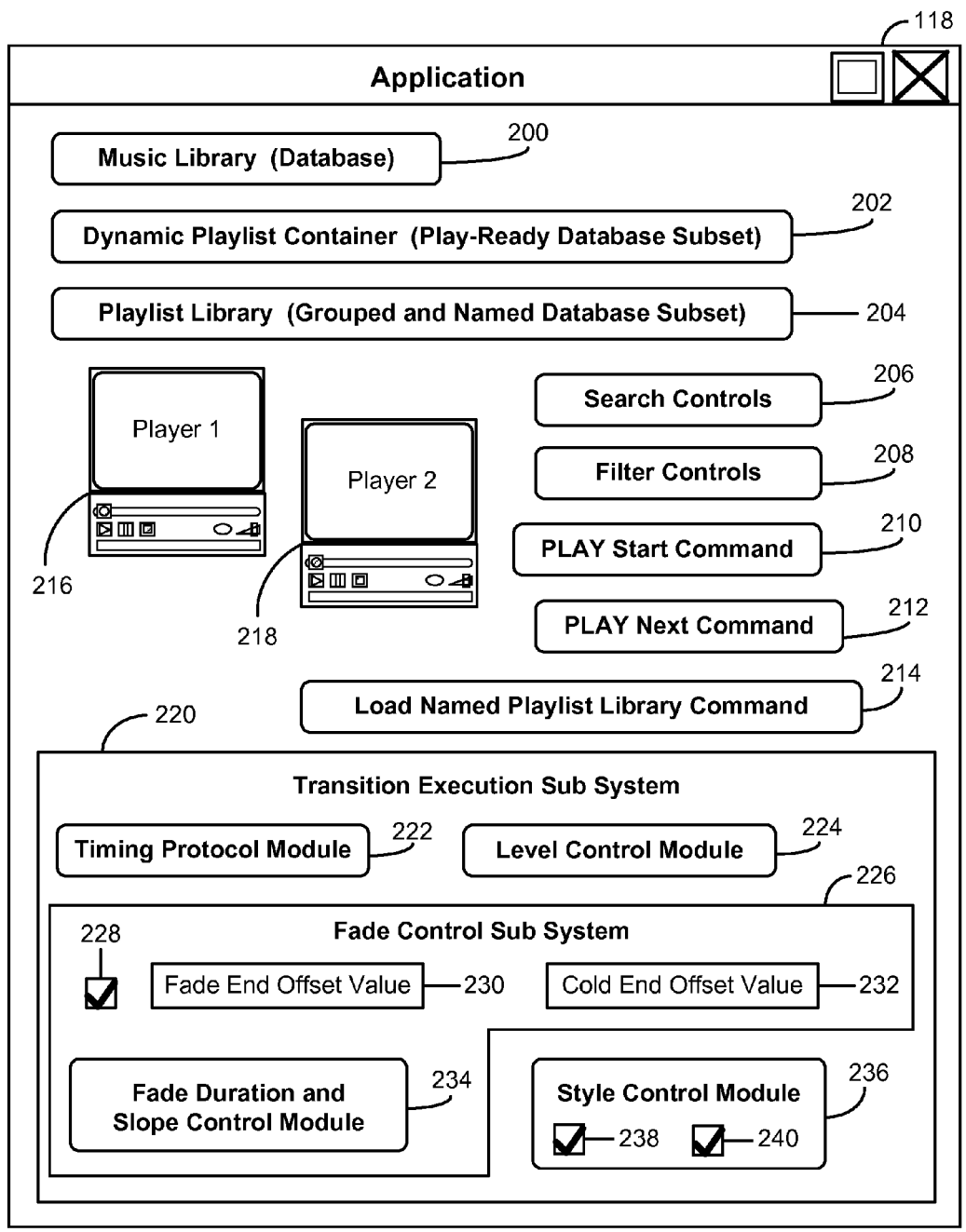
FIG. 2 is a schematic of one example of a computer program application for implementing a controlling process to automatically calculate and execute concurrent and optimally-timed overlapping or adjoined audio transitions in a plurality of digital media players.

FIG. 2 is a schematic of one example of a computer program application 118 for implementing a controlling process to automatically calculate and execute concurrent and optimally-timed overlapping or adjoined audio transitions in a plurality of digital media players. While an embodiment of the invention may interact with all or some of the various elements of the larger application container 118, the disclosure does not seek to claim any particular inventiveness for application 118 elements that are well-known in the prior art. Examples of well-known prior art objects or control structures include search controls 206, filter controls 208, and media player objects 216 and 218.

The application 118 includes a music library (i.e., database) module 200, an affiliated but independent dynamic playlist container (i.e., play-ready database subset) 202, and a playlist library (i.e., grouped and named database subset)

204, programmatically configured for transference to the dynamic playlist container 202 by the load named playlist library command 214.

The term dynamic is used to describe the dynamic playlist container 214 because, in the preferred embodiment, the contents of the dynamic playlist container can be continuously modified by the user (or system automation). Throughout the specification, the shortened term "playlist container" may be used in place of "dynamic playlist container".

The term "load" in the load named playlist library command 214 refers to an action that does not load playlist container content directly into a media player, but instead copies media file key data attributes from a pre-assembled and named playlist library (i.e., collection) to reserved control or memory spaces utilized by the playlist container design.

For an invention, such as detailed in this disclosure, which has been designed to identify, display, load and play media files, it should be understood that the music library 200 will be comprised of database records which include key data attributes for a plurality of recordings. Such key data attributes for each database record (i.e., a collection of information related to a unique library member) in this example will include, but are not limited to, a unique record ID number, a Title, and an Artist name. Additionally, most music library records of the example will also include a Tempo classification, a music Genre classification, and a Year of release, and a Decade of release. Other key attributes may be present for some or all records and such attribute examples may include the declared gender of the lead vocalist, music genre sub classification information, or the text of corresponding lyrics.

However, in order to enable the concurrent digital media player reproduction aspects of the invention, the music library 200, or its functional counterpart in alternative embodiments, will also generally include a mechanism that associates a digital media file (i.e., an audio recording) with each database record (or listed title) that the user (i.e., operator) wishes to play in the system. In the preferred embodiment, the media file association mechanism is enabled by insertion and retention (i.e., storing as in a database field) of a hyperlink object (including a hyperlink path or URL) that points to the physical location of the associated media file on a memory storage device such as a computer's hard drive 110 or a connected USB flash drive 114.

Because the preferred embodiment was developed in a Windows® database product, the music library 200 was naturally created as part of the application 118. However, different embodiments can be envisioned, and such alternative embodiments may or may not incorporate a formal music library 200 in the parent application. Instead, other examples of the invention might include implementations that can access a music database of some type, or simply a collection of folder-stored media files, or by identifying isolated media files on the computing device, or on a memory storage device, or media files provided by an Internet connection or Web-based interface, satellite service, mobile phone service, wireless network, or some other mechanism. Alternative embodiments may also choose not to store a music title's (i.e., an audio recording's) key data attributes in a database. They may instead implement an embodiment of the invention through techniques that somehow use metadata stored with all, or some of, the anticipated system-compatible media files.

Continuing with schematic description for FIG. 2, a search control module 206 is depicted as part of the application 118. The search control module 206 is comprised of independent application 118 search control commands implemented to search key data attribute fields of connected or accessible databases (such as the music library 200). In the preferred embodiment, the search controls are capable of browsing (i.e., examining content), identifying, displaying, and selecting music library 200 records from among a plurality of data fields including: Title, Artist, Music Type (i.e., Genre), Tempo, Decade of Release, Year of Release, Gender of Lead Vocalist, Music Type Sub Genre, BPM (Beat per Minute), and others. In alternative embodiments, such as a folder sort then browse via scroll, or navigation-pad, or swipe (i.e., touch gesture) implementation, the search control functionality may be enabled to directly browse, identify, display, and select records or media file titles, or media files, in order to cause those selections to be marked and staged (i.e., prepared or queued) for reproduction by the system.

Also depicted in FIG. 2 is a filter control module 208. The filter control module 208 is comprised of independent application 118 filter control commands implemented to filter key data attribute fields of connected or accessible databases (such as the music library 200). In the preferred embodiment, the filter controls add to the functionality of the search control module 206. The filter controls are capable applying a "mask" that shows only records that have matching attribute values for the filtered key data field. In effect, an applied filter refines the user view of the larger music title (i.e., media file) collection by creating a smaller record subset linked by the common properties of one or more filtered data attributes. In alternative embodiments, such as a folder sort or scroll implementations, or other implementations previously described above, the filter control functionality may not be provided, or it may somehow be enabled to directly affect records or media file titles in order to allow a user action to mark or stage the filtered selections for reproduction by the system.

In the preferred embodiment, the controls such as Match Artist, Match Decade, Match Music Type (genre), and Match Tempo, etc. are present as UI command buttons where each control applies a key data attribute filter identified by the control name. Also in the preferred embodiment example, each match (i.e., filter) control is programmatically enabled to load a series of its selected (i.e., filtered) titles (i.e., records) to the playlist container. This functionality is termed a "match batch" feature because it allows the user to apply a key data filter, then activate one command to successively load (i.e., copy) filtered records, including their associated hyperlink data, to open positions (i.e., controls or memory spaces) in the playlist container.

Since the example of the preferred embodiment includes a playlist container object 202 which can be filled (e.g., populated with selected music library or other audio recording files) in independent blocks (i.e., sections), the match batch functionality provides a quick way to fill all or part of the playlist container. Match batch filter processing is a feature of one described embodiment, and is not required to practice certain aspects of the invention (such as the automatically calculated duration and optimally-timed concurrently overlapping or adjoined media file presentation aspect) in other embodiments.

Also illustrated in FIG. 2 is a play start command control 210, a play next command control 212, and a load named playlist library command 214. The example embodiment also depicts a first discrete software instantiated (i.e., created) media player 216 designated as Player 1, and a second discrete software instantiated media player 218 designated as Player 2.

In FIG. 2, a transition execution sub system 220 is depicted as part of the application 118. Components of the transition execution sub system 220 include the timing protocol module 222, the level control module 224, and the style control module 236. The style control module 236 includes the CSS (i.e., cold start status) check box 238, and the CES (i.e., cold end status) check box 240.

Finally, also depicted in FIG. 2, and part of the transition execution sub system 220 is the fade control sub system 226 with the auto fade on check box 228, the fade end offset interval value control 230, the cold end offset interval value control 232, and the fade duration and slope control module 234.

The aspects of the invention that include the automatic calculation of media file durations and related enabled functionality are primarily concerned with the programmatically controlled interaction of various elements of the transition execution sub system 220. However, other elements appearing in FIG. 2, such as the independent dynamic playlist container 202, along with inventive programmatic structures and behaviors of the playlist library 204, the search controls 206, the filter controls 208 (and their related match batch controls), and the play next command 212, may also become the subject of invention claims.

The example of the preferred embodiment does not include specific program functionality for the CSS (i.e., cold start status) check box 238, however the 238 control is included in the illustration order to demonstrate how other embodiments may wish to embellish functionality. For example, adapting the system and methods described in connection with the classification of fade end or cold end media files would enable invention aspects to determine and apply control durations and audio levels further refined for media files having a sound design with a cold (i.e., abrupt) start.

Figure 3:
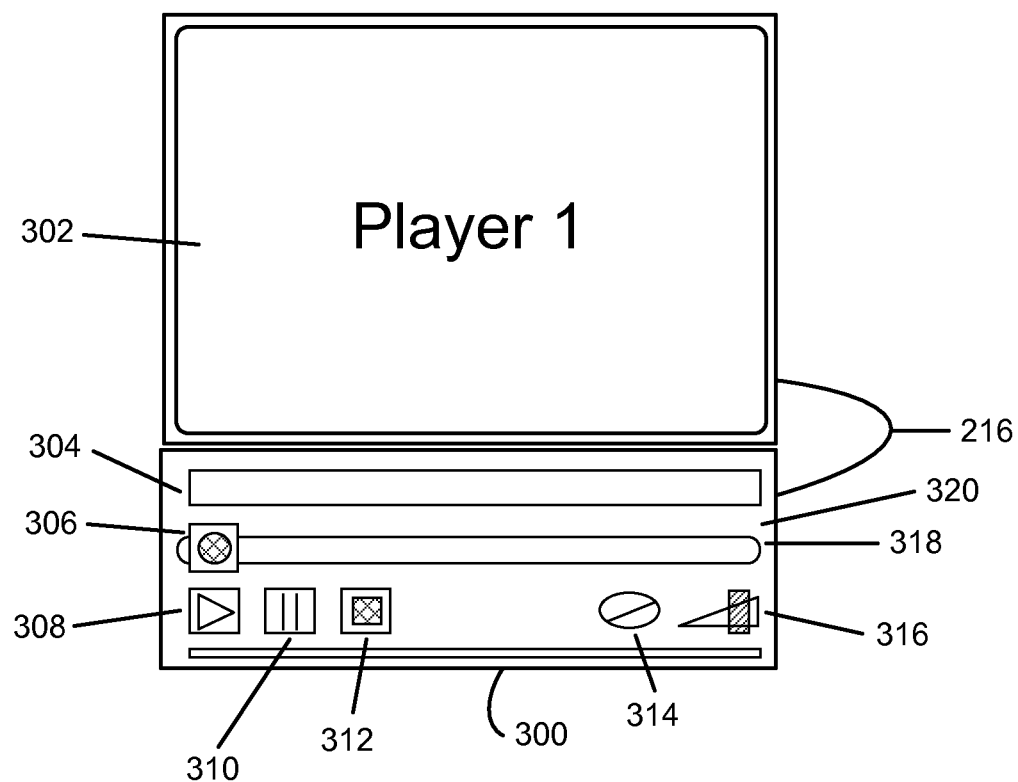
FIG. 3 is a diagram of a typical first Microsoft® ActiveX® media player object (MPO) designated as Player 1.

FIG. 3 is a diagram of a typical first Microsoft® ActiveX® media player object (MPO) designated as Player 1 216. The MPO Player 1 216 primary controls in this example are presented on the media player control panel 300, and include the media file display screen 302, the track data display 304, the timeline seek slider 306, the MPO discrete play button 308, pause button 310, and stop button 312.

Also depicted are the MPO mute button 314, volume level slider control 316, the timeline seek bar 318, and the player's audio stream output content generator 320.

The preferred embodiment of the present invention is particularly concerned with the audio component of a media player object, especially its timing and manipulation for concurrent or adjoined reproductive presentation. However, the media file display screen 302, is included here as an orientation aid. Additionally, since alternative embodiments may choose to incorporate the invention in the presentation of digital audio with digital video, the media file display screen 302 shall remain in the illustration.

ActiveX® media player objects from other vendors could easily be used in alternative embodiments. Additionally, hardware-based MPOs could be utilized to practice an alternative embodiment. The Microsoft® ActiveX® media player objects described here illustrate an example of the preferred embodiment. Further, in the invention, not all Microsoft® MPO controls, and their corresponding methods, events, or properties will be utilized. However alternative embodiments could practice the invention while addressing the specific capabilities of any of these Microsoft® controls, or additional controls on other media player objects.

Figure 4:
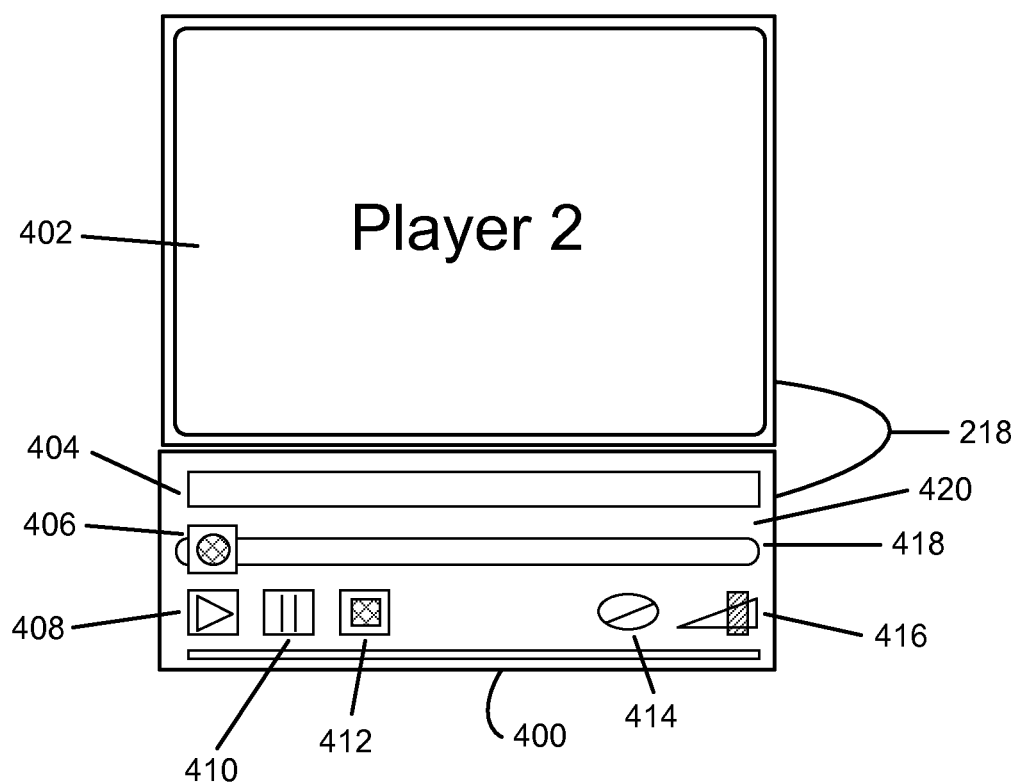
FIG. 4 is a diagram of a typical second Microsoft® ActiveX® media player object (MPO) designated as Player 2.

FIG. 4 is a diagram of a typical second Microsoft® ActiveX® media player object (MPO) designated as Player 2 218. The MPO Player 2 218 primary controls in this example are presented on the media player control panel 400, and include the media file display screen 402, the track data display 404, the timeline seek slider 406, the MPO discrete play button 408, pause button 410, and stop button 412.

Also depicted are the MPO mute button 414, volume level slider control 416, the timeline seek bar 418, and the player's audio stream output content generator 420.

The preferred embodiment of the present invention is particularly concerned with the audio component of a media player object, especially its timing and manipulation for concurrent or adjoined reproductive presentation. However, the media file display screen 402, is included here as an orientation aid. Additionally, since alternative embodiments may choose to incorporate the invention in the presentation of digital audio with digital video, the media file display screen 402 shall remain in the illustration.

ActiveX® media player objects from other vendors could easily be used in alternative embodiments. Additionally, hardware-based MPOs could be utilized to practice an alternative embodiment. The Microsoft® ActiveX® media player objects described here illustrate an example of the preferred embodiment. Further, in the invention, not all Microsoft® MPO controls, and their corresponding methods, events, or properties will be utilized. However alternative embodiments could practice the invention while addressing the specific capabilities of any of these Microsoft® controls, or additional controls on other media player objects.

Figure 5:
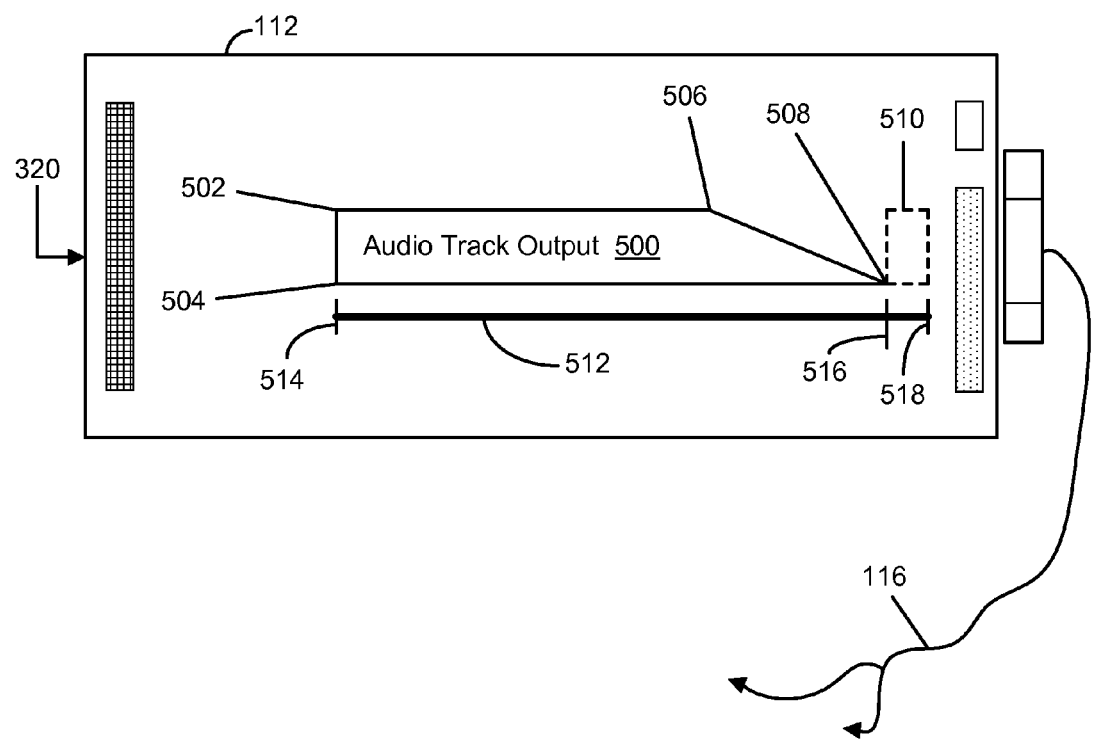
FIG. 5 is a schematic diagram of a typical sound card circuit with a visual depiction of the audio track output (i.e., stream) volume level for a media file which concludes with a fade (i.e., gradual volume reduction) ending.

Moving now to FIG. 5, a schematic diagram of a typical sound card circuit 112 with a visual depiction of the audio track output (i.e., stream) volume level 500 for a media file which concludes with a fade (i.e., gradual volume reduction) ending. Because key aspects of the invention are concerned with the sound design and structural composition of each media file's total duration (namely the fact that most digital audio files are comprised of at least a first creative content section, and a second silence suffix section), FIG. 5 illustrates the key facets of a typical fade-end audio track output volume level 500.

Therefore, in FIG. 5, a sound card circuit 112 is illustrated accepting the media player audio signal as generated by, in this example, the audio stream output content generator 320 from Player 1. An audio track output volume level timeline 512 is included as a total duration (i.e., full length) reference calibration line. A calibration symbol 514 represents (i.e., marks) the first moment (i.e., point in time) when the creative content section of the audio stream begins.

Note: Some digital audio formats, which may incorporate DRM (digital rights management) technology, place header content in a media file. The present invention is not overly concerned with this aspect of media file creations. However, because in some instances, the header content may cause a brief delay before the audible reproduction of creative content, alternative embodiments could accommodate media files with header information that may manifest as a silent section positioned before the creative content section.

Continuing now with FIG. 5, a calibration symbol 516 represents the moment when the creative content section of the audio stream fully ends, and the silence suffix section begins. 518 is a calibration symbol that represents the moment when the silence suffix section ends; and 518 is also the point at which the total duration of the media file's audio track output steam ends. Remember that a file's audio track output steam will generally include both an audible creative content section and an inaudible silence suffix section. Understand also that while the interval of each media file's silence suffix section may be reliably estimated as equivalent to comprising at least a first or second pre-determined length, the interval of the first creative content section positioned before the second silence suffix section will generally vary for each media file; and the first creative content section interval variance might be, for example, as little as 1,000 milliseconds (i.e., 1 second) and as great as tens of thousands of milliseconds, hundreds of thousands of milliseconds, or more. For example, a 1 hour audio recording is the equivalent of 3,600,000 milliseconds.

With regard to silence suffix offset values (i.e., intervals), the preferred embodiment uses only two pre-determined (but user or system adjustable) intervals. However, alternative embodiments can be envisioned that utilize two silence suffix offset values (fade or cold end) which are subject to song-specific modification. For example, solutions that identify and classify songs (i.e., media file audio recordings) having a longer fade time than average may use a formula that subtracts an additional interval from the global fade offset value. This would prevent an undesirably low audio level of such songs as they play out according to the extended fade effect of their sound design.

In FIG. 5, when plotted above the audio track output volume level timeline 512, additional key calibration markers can be observed in the audio track output volume level 500. In this example, the start of first audio (i.e., the initial audible sound) begins at full volume (100%) 502.

As a point of reference, if the example instead specified first audio beginning as quiet (as might be typical of a fade in), the audio track output volume level 504 at the start of first audio might be zero. However, this is not the case in the current FIG. 5 example.

Continuing with FIG. 5, as stated, the example places the audio track output volume level at first audio 502 at 100%. 506 depicts a point in the media file's output stream where the volume is last equal to 100%, and it is therefore also the point at which the fade begins. 508 depicts a point in the media file's output stream where the volume is first equal to 0% (i.e., complete fade out), and it is also therefore the point at which the creative content section ends, coinciding with 516; and 508 is also the point where the silence suffix section begins. 518 is the point where the silence suffix section ends. Therefore, 518 is also the point at which the measured duration (i.e., the programmatically retrieved total running time or the "full length") of a media file ends.

A depiction of the area of the silent section audio volume spectrum 510 is included. 510 represents the completely silent section which adds a certain (average but not always the same) duration to the end of most media files. In the preferred embodiment, in order to automatically compute a calculated duration for the first section, a silence section (i.e., second section) offset interval equal to the duration of 510 is a pre-determined average duration (such as 5 seconds). Finally, in FIG. 5, the output device 112 is depicted with audio output cables 116 configured for optional connection with powered loudspeakers.

In other embodiments, after evaluating the average silence section interval for the majority of intended use media files, the silent section audio volume spectrum 510 pre-determined value may be changed to less than or more than 5 seconds.

Observe that in FIG. 5, the area between 506 and 508 is depicted as a sloping line that angles down from left to right. This is intended to illustrate the gradual fade (i.e., level reduction) effect of an audio track output 500 that concludes with a fade ending.

As will be made clear by the presence of assorted calibration symbols and time markers in these drawings, and in related descriptions, an integral part of the invention will be its ability to recognize obvious and non-obvious media file properties such as interval lengths and interval boundaries; and then perform operations based in part on the relational functionality and consequences of certain media file interval boundaries, where those boundaries involve a media file's creative content and silence suffix sections, and each sections' relationship to the measured duration (i.e., the programmatically retrieved total running time or "full length") of a media file.

In particular, an important aspect of the invention illustrated in FIG. 5 will be the capability for the system and methods to recognize the audio track output volume level timeline 512 as representing the full length (i.e., total duration) of the example fade end audio stream including its appended silence suffix; and to be further capable of distinguishing between a first creative content section, having a first section event time (i.e., interval), and a second silence suffix section, having a second section event time (i.e., interval); and for instructions in the invention to be operable to performing formula-based time interval calculations which incorporate an ability to recognize and estimate the interval value (i.e., the numerically represented time period) of each media file's first and second section.

For example, in the illustration of FIG. 5, the first section begins with calibration symbol 514 and ends with calibration symbol 516, and the second section begins with calibration symbol 516 and ends with calibration symbol 518. The system formula asserts that a media file which resolves (i.e., concludes) with a fade ending will also have an appended interval of silence, and consequently it "back times" (i.e., offsets or subtracts) the presumed (i.e., estimated) interval of silence from the full length when calculating the optimum duration for the creative content of the associated media file. Once known, the optimum duration for the creative content of the associated media file can be assigned (i.e., transferred) to a play event timer object, and the system can be programmed to control the, for example, first media file's reproduction duration utilizing the interval value assigned to the play event timer.

Then, in order to achieve an independently calculated second media file first section duration in this example, the process can be repeated with activation of the play next event, wherein the start of the play next event begins playing the first creative content section of a second media file as a concurrent overlapping audio stream audibly presented with the fading end audio stream of the first creative content section of the first media file.

For FIG. 5, in the preferred embodiment, the following calculated content duration (CCD) formula (i.e., calculated duration) for this fade end media file example will be formed in program structures communicatively connected with the processor 102. (Note: all CCD formula values will be numbers computed as milliseconds):

Audio track output volume level timeline 512 total duration (i.e., full length) MINUS the silent section audio volume spectrum 510 EQUALS the audio track output (i.e., stream) volume level 500.

In this formula, using the depicted segments, 500 is equal to the creative content first section interval of a fade end track (i.e., media file); the reproduced audible audio stream occurring between calibration symbols 514 and 516. This is the formula of the invention used to automatically compute the calculated duration which is the first section. The same formula can also be expressed as:

Measured Duration Value 710 MINUS the predetermined Fade End Offset Interval Value 230 EQUALS the Calculated Duration Value 718. The basis for the creation of this formula is also examined in the detailed description of FIG. 8.

Figure 6:
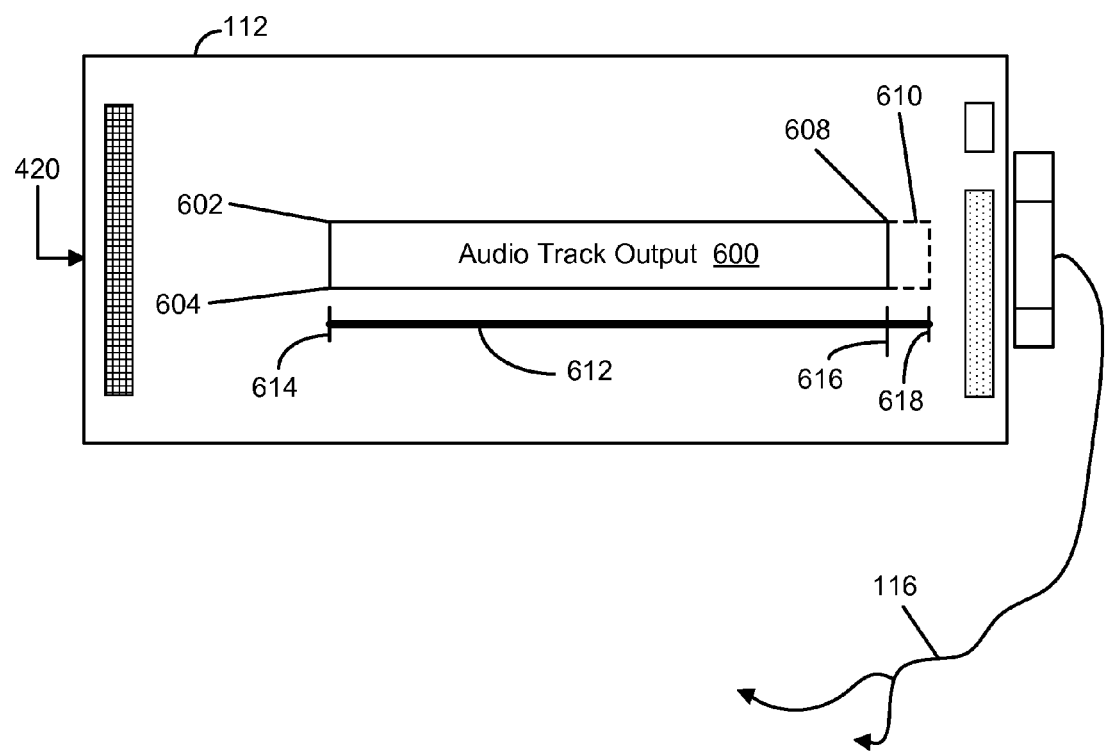
FIG. 6 is a schematic diagram of a typical sound card circuit with a visual depiction of the audio track output (i.e., stream) volume level for a media file which concludes with a cold (i.e., abrupt and non-gradual volume reduction) ending.

Moving now to FIG. 6, a schematic diagram of a typical sound card circuit 112 with a visual depiction of the audio track output (i.e., stream) volume level 600 for a media file which concludes with a cold (i.e., abrupt and non-gradual volume reduction) ending. Because key aspects of the invention are concerned with the sound design and structural composition of each media file's total duration (namely the fact that most digital audio files are comprised of at least a first creative content section, and a second silence suffix section), FIG. 6 illustrates the key facets of a typical cold-end audio track output volume level 600.

Therefore, in FIG. 6, a sound card circuit 112 is illustrated accepting the media player audio signal as generated by, in this example, the audio stream output content generator 420 from Player 2. An audio track output volume level timeline 612 is included as a total duration (i.e., full length) reference calibration line. A calibration symbol 614 represents (i.e., marks) the first moment (i.e., point in time) when the creative content section of the audio stream begins.

Note: Some digital audio formats, which may incorporate DRM (digital rights management) technology, place header content in a media file. The present invention is not overly concerned with this aspect of media file creations. However, because in some instances, the header content may cause a brief delay before the audible reproduction of creative content, alternative embodiments could accommodate media files with header information that may manifest as a silent section positioned before the creative content section.

Continuing now with FIG. 6, a calibration symbol 616 represents the moment when the creative content section of the audio stream fully ends, and the silence suffix section begins. 618 is a calibration symbol that represents the moment when the silence suffix section ends; and 618 is also the point at which the total duration of the media file's audio track output steam ends. Remember that a file's audio track output steam will generally include both an audible creative content section and an inaudible silence suffix section. Understand also that while the interval of each media file's silence suffix section may be reliably estimated as equivalent to comprising at least a first or second pre-determined length, the interval of the first creative content section positioned before the second silence suffix section will generally vary for each media file; and the first creative content section interval variance might be, for example, as little as 1,000 milliseconds (i.e., 1 second) and as great as tens of thousands of milliseconds, hundreds of thousands of milliseconds, or more. For example, a 1 hour audio recording is the equivalent of 3,600,000 milliseconds.

With regard to silence suffix offset values (i.e., intervals), the preferred embodiment uses only two pre-determined (but user or system adjustable) intervals. However, alternative embodiments can be envisioned that utilize two silence suffix offset values (fade or cold end) which are subject to song-specific modification. For example, solutions that identify and classify songs (i.e., media file audio recordings) having a longer fade time than average may use a formula that subtracts an additional interval from the global fade offset value. This would prevent an undesirably low audio level of such songs as they play out according to the extended fade effect of their sound design.

In FIG. 6, when plotted above the audio track output volume level timeline 612, additional key calibration markers can be observed in the audio track output volume level 600. In this example, the start of first audio (i.e., the initial audible sound) begins at full volume (100%) 602.

As a point of reference, if the example instead specified first audio beginning as quiet (as might be typical of a fade in), the audio track output volume level 604 at the start of first audio might be zero. However, this is not the case in the current FIG. 6 example.

Continuing with FIG. 6, as stated, the example places the audio track output volume level at first audio 602 at 100%. Because this example is a cold end media file, it differs from a fade end media file. Therefore, in a typical cold end file there is not a point where the volume level is dramatically reduced as part of a gradual fade. 608 depicts a point in the media file's output stream where the volume is last equal to 100%, and since this example is from a cold end file, it also depicts a point in the media file's output stream where the volume for the file's creative content duration is transformed to 0% (i.e., silent); and therefore 608 is also the point at which the creative content section ends, coinciding with 616; and 608 is also the point where the silence suffix section begins. 618 is the point where the silence suffix section ends. Therefore, 618 is also the point at which the measured duration (i.e., the programmatically retrieved total running time or "full length") of a media file ends.

A depiction of the area of the silent section audio volume spectrum 610 is included. 610 represents the completely silent section which adds a certain average (but not always the same) duration to the end of most media files. In the preferred embodiment, in order to automatically compute a calculated duration for the first section, a silence section (i.e., second section) offset interval equal to the duration of 610 is a pre-determined average duration (such as 5 seconds). Finally, in FIG. 6, the output device 112 is depicted with audio output cables 116 configured for optional connection with powered loudspeakers.

In other embodiments, after evaluating the average silence section interval for the majority of intended use media files, the silent section audio volume spectrum 610 pre-determined value may be changed to less than or more than 5 seconds.

Observe that in FIG. 6, the area between 602 and 608 is depicted as a level straight line (that does not slope down at an angle). This is intended to illustrate that the audio track output 600 in this example concludes with a cold (i.e., abrupt) ending which is not characterized by a noticeable level reduction.

As will be made clear by the presence of assorted calibration symbols and time markers in these drawings, and in related descriptions, an integral part of the invention will be its ability to recognize obvious and non-obvious media file properties such as interval lengths and interval boundaries; and then perform operations based in part on the relational functionality and consequences of certain media file interval boundaries, where those boundaries involve a media file's creative content and silence suffix sections, and each sections' relationship to the measured duration (i.e., the programmatically retrieved total running time or "full length") of a media file.

In particular, an important aspect of the invention illustrated in FIG. 6 will be the capability for the system and methods to recognize the audio track output volume level timeline 612 as representing the full length (i.e., total duration) of the example cold end audio stream including its appended silence suffix; and to be further capable of distinguishing between a first creative content section, having a first section event time (i.e., interval), and a second silence suffix section, having a second section event time (i.e., interval); and for instructions in the invention to be operable to performing formula-based time interval calculations which incorporate an ability to recognize and estimate the interval value (i.e., the numerically represented time period) of each media file's first and second section.

For example, in the illustration of FIG. 6, the first section begins with calibration symbol 614 and ends with calibration symbol 616, and the second section begins with calibration symbol 616 and ends with calibration symbol 618. The system formula asserts that a media file which resolves (i.e., concludes) with a cold (i.e., abrupt) ending will also have an appended interval of silence, and consequently it "back times" (i.e., offsets or subtracts) the presumed (i.e., estimated) interval of silence from the full length when calculating the optimum duration for the creative content of the associated media file. Once known, the optimum duration for the creative content of the associated media file can be assigned (i.e., transferred) to a play event timer object, and the system can be programmed to control the, for example, first media file's reproduction duration utilizing the interval value assigned to the play event timer.

Then, in order to achieve an independently calculated second media file first section duration in this example, the process can be repeated with activation of the play next event, wherein the start of the play next event begins playing the first creative content section of a second media file as an adjoined (i.e., abutted) audio stream audibly aligned with the cold end audio stream of the first creative content section of the first media file.

For FIG. 6, in the preferred embodiment, the following calculated content duration (CCD) formula (i.e., calculated duration) for this cold end media file example will be formed in program structures communicatively connected with the processor 102. (Note: all CCD formula values will be numbers computed as milliseconds):

Audio track output volume level timeline 612 total duration (i.e., full length) MINUS the silent section audio volume spectrum 610 EQUALS the audio track output (i.e., stream) volume level 600.

In this formula, using the depicted segments, 600 is equal to the creative content first section interval of a cold end track (i.e., media file); the reproduced audible audio stream occurring between calibration symbols 614 and 616. This is the formula of the invention used to automatically compute the calculated duration which is the first section. The same formula can also be expressed as:

Measured Duration Value 710 MINUS the predetermined Cold End Offset Interval Value 232 EQUALS the Calculated Duration Value 718. The basis for the creation of this formula is also examined in the detailed description of FIG. 9.

Figure 7:
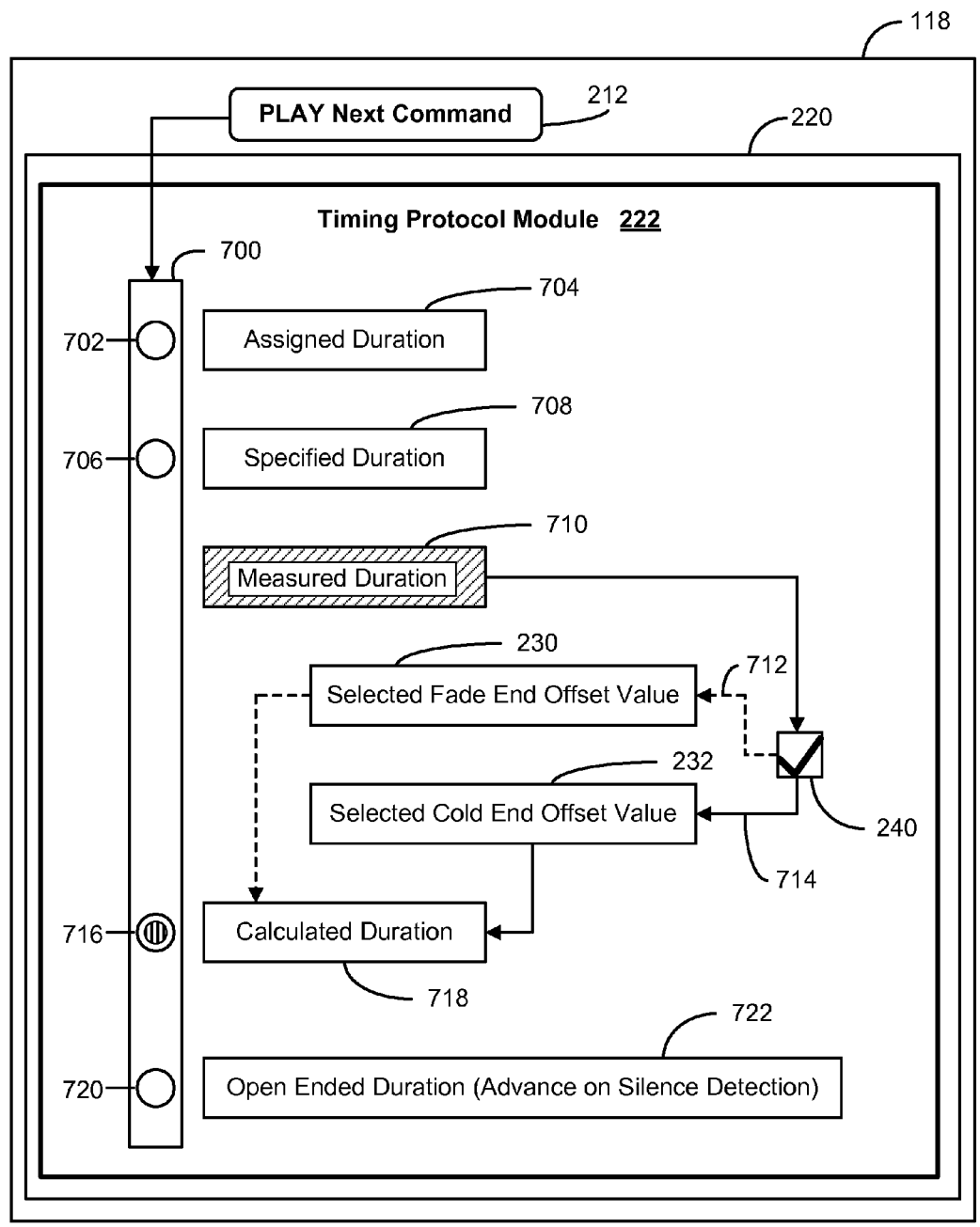
FIG. 7 is a flow chart example depicting the logic process in the transition execution sub system that determines the automatically calculated duration of a media file, starting with the initiation of the play next command.

Now referring to FIG. 7 which is a flow chart example depicting the logic process in the transition execution sub system 220 that determines the automatically calculated duration 718 of a media file, starting with the activation of the PLAY NEXT command 212. The flow process begins in the UI (user interface) of the computer program product (i.e., application) 118.

Continuing with the flow chart description for FIG. 7 where a user has previously launched (i.e., opened) the application 118 and used its search controls 206, and possibly also its filter controls 208, to identify and select music tracks (i.e., media files) which are associated with a music library 200.

Previously selected media files were placed in the dynamic playlist container 202, and are now play-ready. Alternatively, using controls in this example implementation, the user might have selected a pre-assembled music playlist from the playlist library 204 and then transferred that music list to the dynamic playlist container 202 by clicking the load named playlist library command 214. In any case, the flow process in FIG. 7 presumes that a plurality of music recordings (i.e., media files) have been placed in the playlist container 202 and that, in this example, a first media file has begun playing in media player 1 216 and that this process was initiated when the user command-clicked the play start command 210.

At this point, continuing with a description of the preferred embodiment as illustrated by FIG. 7, when the user UI click activates the play next command 212, or programming instructions in the application 118 automatically initiate the play next command 212, the application's workflow moves to the timing protocol module 222 and encounters the timing protocol logic switch 700. The timing protocol logic switch 700 is present to permit the user to choose from among a plurality of timing modes. In the example embodiment, using a radio button on the timing protocol logic switch 700 selects the radio button's corresponding timing protocol mode, and therefore unselects all other modes.

This FIG. 7 example will illustrate four timing mode options and each mode applies a different set of programming rules created in order to assign a duration value to a media file. However, for the methods and system involving the automatic calculation of optimized digital media durations in the present invention, there is a requirement for only one timing mode, specifically a calculated duration value 718 which will be explained below.

The different mode states of the timing protocol logic switch 700 are changed by a UI selection of one of a plurality of interface "radio" buttons. Radio buttons in Windows® programs like the preferred embodiment are symbols depicted as circles displayed adjacent to an interface option. When depicted with a dark-filled circle inside a larger unfilled circle, a radio button is understood to be selected; and when the circle is presented without a dark-filled inner circle, the radio button is understood to be unselected.

In FIG. 7, if radio button 702 on the timing protocol logic switch 700 is engaged (i.e., highlighted or selected), activation of the play next command 212, will cause the next transition event to transpire with an assigned duration value 704. In this embodiment, an assigned duration mode is equivalent to a preview (i.e., sample) timing mode where a media file can be assigned a limited duration. The term "limited" as used here in connection with describing the assigned duration value 704 is defined as a precise length that may be an interval less than the total creative content duration. Using an assigned duration value 704 of 20 seconds for transitions activated with a plurality of songs (i.e., audio recordings) where each song's creative content was, for example, at least 150 seconds, would effectively limit the system-reproduced duration of each song to 20 seconds; thereby "sampling" the first 20 second portion of concerned media files.

As another example, if radio button 702 on the timing protocol logic switch 700 is selected, and the system is programmed to set the duration of the assigned duration value 704 for media files to 30 seconds, reproduction of media files activated with the play next command 212 will be initiated with a program-specified duration of 30 seconds. As envisioned, this embodiment does not limit an assigned duration value 704 to 30 seconds or any other value. Therefore, other duration values such as 10 seconds, 45 seconds, 60 seconds, 120 seconds, and so on, could be used to produce the same functionality.

The assigned duration timing protocol is a feature of an embodiment using a timing protocol logic switch 700 with more than one timing mode, but the assigned duration value 704 timing protocol is not required to practice an embodiment of the invention.

Continuing with FIG. 7, if radio button 706 on the timing protocol logic switch 700 is selected, activation of the play next command 212 will cause the next transition event to transpire with a specified duration value 708. In this embodiment, a specified duration value is equivalent to a quantified (i.e., precise) interval timing mode where a media file duration has been previously determined by an operator or process, and stored by the music library 200 (or some other program accessible control). A specified duration value 708 applies to a discrete (i.e., individual) file, and each media file's specified duration value 708 must be independently ascertained and assigned.

For instance, if radio button 706 on the timing protocol logic switch 700 is selected, and the system is commanded (by a user acting in an administrative role) to set the specified duration value 708 for a discrete media file to 150 seconds (i.e., 2 minutes and 30 seconds), reproduction of the media file activated by the play next command 212 will be initiated with a duration value of 150 seconds. As envisioned, this embodiment does not limit a specified duration value 708 to 150 seconds or any other value. Therefore, other duration values such as 10 seconds, 30 seconds, 47 seconds, 60 seconds, 120.5 seconds, 180 seconds, and so on, could be used to produce the same functionality.

Additionally, in this embodiment, but not necessarily other embodiments, programming rules give priority to an assigned duration value 704. As a practical consequence, this means for a discrete (i.e., individual) media file that is recognized as having a specified duration value 708, the system will not give priority to the specified duration value 708, and therefore the assigned duration value 704 will apply in that case.

The specified duration value 708 timing protocol mode is a feature of an embodiment using a timing protocol logic switch 700 with more than one timing mode, but the specified duration value 708 timing protocol is not required to practice an embodiment of the invention. Additionally, a timing protocol logic switch 700 is not required for an implementation to practice the invention's ability to enable automatic and optimally-timed overlapping and adjoined transitions; but the inventive techniques concerning the measured duration value 710 and the computation and application of the calculated duration 718 described below are necessary.

As a practical consequence, a specified duration value 708 mode adds capabilities equivalent to broadcast automation software or hardware products that allow a media file to be assigned a precise reproduction duration. The astute reader will realize that the specified duration value 708 mode is an optional feature of the preferred embodiment, and since it requires some form of human-instigated interaction or process calculation, it is not truly automatic; and therefore the specified duration value 708 mode is not concerned with enabling the automatic and optimal media file duration functionality aspect of the invention.

Now referring to radio button 716 in FIG. 7, where radio button 716 is situated on the timing protocol logic switch 700. The functionality activated by radio button 716 is an integral element of this example implementation because selecting 716 engages the calculated duration value 718 mode (which is the default timing mode of the preferred embodiment). And, as is fully-detailed in this disclosure, the calculated duration value 718 is used by the invention to enable automatic and optimally-timed overlapping and/or adjoined media file transitions.

Because the system will be made aware of each discrete media file's end style by the true/false (i.e., checked or unchecked) state of the cold end status check box 240, the system will programmatically apply an appropriate offset interval value when computing the calculated duration 718 for each discrete file. This is important because, as will be detailed, the selected fade end offset interval value 230, and the selected cold end offset interval value 232, will be different intervals, and each interval value will be presumed (i.e., estimated) to be a suitable fit (i.e., match) for a media file's corresponding end style. The concept of an offset interval value will be described in greater detail elsewhere, but the reader is informed here that the independent offset interval value controls provide a means for a programmed formula to subtract a presumed interval of silence from the (second section) end of digitally created audio files.

In the preferred embodiment of the invention, the state of the cold end status check box 240 is manually set with a true or false declaration by the database administrator or music library 200 editors. However, it can be envisioned that other methods might be used to classify or automatically classify the start or end production sound design of a media file. One such method could be a retrieved value from a metadata tag. Another method could be digital waveform analysis.

For example, in another embodiment, instead of relying on a manually entered CES (i.e., cold end status) check box 240 database value, program structures could be formed with the objective of identifying and marking all evaluated media files as either "fade end" or "cold end". This could be implemented by analysis of an end section interval of each media file's waveform peaks, average height, and intensity. Media files determined to have a sloping waveform that gradually decreased over time near the conclusion of the file could be marked as "fade end" files. Conversely, media files determined to have a non-sloping waveform that exhibited an abrupt waveform cutoff at the conclusion of the file could be marked as cold end files. This sort of end style computation might bring a higher level of automation to the process of classifying media files, but it would come at the price of costlier processing cycles, and viable implementation would likely require a powerful computing device.

Continuing with FIG. 7, the following controls and their associated values are directly involved with the computation of the calculated duration value 718: The measured duration value 710, the cold end status check box 240, the selected fade end offset interval value 230, and the selected cold end offset interval value 232.

Elsewhere in the specification, for the sake of brevity, the terms "selected fade end offset interval value" and "selected cold end offset interval value" may be instead expressed as: "selected fade end offset value" and "selected cold end offset value"; or "fade end offset value" and "cold end offset value"; or other similar constructions, but they all share the same meaning Aspects of the invention have been purposely designed to enable computation of the calculated duration value 718. Therefore, in FIG. 7, it should be understood that if radio button 716 on the timing protocol logic switch 700 is engaged (i.e., selected), activation of the play next command 212 will cause the next transition event to transpire with a calculated duration value 718.

For the invention, the calculated duration value 718 will be defined as a media file reproduction duration (i.e., interval) which has been computed for a discrete (i.e., individual) media file with the objective of making the calculated duration value 718 equal to the estimated duration of that same media file's creative content duration. The creative content duration is equivalent to the creative artistry portion of a media file's audible content and, as such, does not include any intervals of appended silence.

The concepts of a media file's natural conclusion, creative content duration, and silence suffix duration are defined and explained in great detail elsewhere in this specification. Different embodiments of the invention may choose to utilize a calculated duration value 718 by execution or incorporation of dissimilar mechanisms (such as computer-program instructions or an integrated circuit), however these alternative embodiments, if using a calculated duration value 718 as envisioned by the invention, will be practicing the teachings of the invention.

With the methods and system of the invention, once the calculated duration value 718 of any media file is known (i.e., or presumed), the calculated duration value 718 can be transferred (i.e., copied or assigned) to a media file event timer which can be programmed to control the file's reproduction duration; and when that duration interval is elapsed, the system can be instructed to start the next play event (and therefore also the next transition event).

In the preferred embodiment illustrated by FIG. 7, the auto fade on check box 228 is part of the fade control sub system 226 which is part of the transition execution sub system 220 which is part of the application 118. During any event transition, without regard to which timing protocol mode is selected, fade level reductions will be applied according to programmed level reduction calculations if the user, or a process, has placed a check in the auto fade on check box 228. Conversely, and still referring to the preferred embodiment, if the auto fade on check box 228 is unchecked (i.e., equal to a Boolean false value), programmed level reductions will not be executed. The true/false (i.e., checked or unchecked) state of the auto fade on check box 228 has no effect on the transition event timing calculations. This is true for transition events executed using one of the timing protocol modes explained in FIG. 7. Inclusion of the auto fade on check box 228 control is not required to practice the invention in every embodiment.

Also illustrated in the preferred embodiment, is the fade duration and slope control module 234 which is part of the fade control sub system 226. Since each transition event will be created using the techniques described for the invention, it is important to state that each transition event will exist over an interval of time and, therefore, each transition event will be comprised of at least a starting point and an ending point. However, no event transition duration is created independently. Instead, the start boundary of the event transition duration is created by activation of the PLAY NEXT command 212, and the end boundary will be determined by one of two events.

If the auto fade on check box 228 is checked (i.e., equal to a Boolean true value), the end boundary for a transition event duration will occur at the moment (i.e., point in time) that the specified value in the fade duration and slope control module 234 first reduces the audio level of the preceding (i.e., first) media file to zero. In such cases, for example, if the transition is an overlapping transition, this will be the moment at which the audible creative content of the first media file will not be noticeable to the listener, while at the same time the audible creative content of the next (i.e., second) media file will continue to be heard by the listener. This will be a closed-ended conclusion to the transition event duration. Obviously, if a 5 second fade duration is started when the concluding (i.e., first) media file has only 3 seconds of remaining audible creative content, the listener will only hear the first 3 seconds of the event transition's first media file. In such cases, the fade duration event will continue as programmed, even though the tangible effect has ended.

In cases where the auto fade on check box 228 is unchecked, the specified value in the fade duration and slope control module 234 will be ignored, and an end boundary will be created by the natural conclusion of the preceding (i.e., first) media file which may resolve (i.e., conclude) with a fade or cold ending. Since the auto fade on check box 228 is unchecked, the sound design of the preceding media file will be the determining factor. This will be an open-ended conclusion to the transition event duration.

In the preferred embodiment, but not required to practice the invention in every embodiment, the fade duration and slope control module 234 will permit the user, or a process, to choose from one of three different event transition durations, and each of those different durations is paired with a fade slope. A fade slope is the rate of level reduction applied over time (and typically computed in milliseconds).

For the preferred embodiment example, the fade duration and slope control module 234 is implemented as a UI slide control. When the user, or a process, changes the slider position, the associated fade duration and slope control 234 value is modified. In the default middle position, the value 234 is programmed for 5 seconds. If the slider is positioned far left, the value 234 will be specified as 3 seconds; and if the slider is positioned far right, the value 234 will be specified as 7 seconds. In this manner the UI permits the operator to change the boundaries of the fade duration, which in turn can change the duration of an applied transition event. Regarding the paired fade slope values, if the default value 234 is 5 seconds, the paired fade slope will apply a moderate level reduction with each passing second of the fade. However, for example, if the value 234 is 7 seconds, the paired fade slope will apply a mild level reduction with each passing second of the fade, and when the value 234 is 3 seconds, the paired fade slope will apply an aggressive level reduction with each passing second of the fade To practice the invention only a single fade duration value 234 must be specified, activated and incorporated with the events that transpire at the activation of the PLAY NEXT command 212. Therefore, at least one slope pattern (such as a mild, moderate or aggressive reduction response) should be incorporated as part of the fade duration calculation and command execution.

Here is an example of a transition event that incorporates a fade duration value 234 with a paired fade slope. When the PLAY NEXT command 212 is activated a set of programming instructions will execute. One of those instructions will include a reference to the value stored in the fade duration and slope control module 234. If the value 234 is equal to 5 seconds (i.e., 5000 milliseconds), and the auto fade on check box 228 is true (i.e., checked), the start of the transition event will coincide with the start of a 5 second "fade to zero" (i.e., gradual level reduction from the current level to quiet) action for the preceding media file audio track output stream. During the fade action, the level of audio reduction with each passing second will be, in this example, moderate. The effect will produce a level reduction on the concluding (i.e., first) media file of approximately 30% by the end of second one, 45% by the end of second two, 65% at the end of second three, 85% at the end of second four, and 100% at a moment which occurs 5 seconds after activation of the transition event (which, in this example, was triggered by the start of the play next event). The listed level percentage reductions are arbitrary and can be changed as desired by the programmer. The objective is to enable the system to execute an automatic fade to zero within the specified fade duration interval.

Having explained the related functionality of objects involved in one embodiment's implementation of the automatic and optimal media file duration functionality aspect of the invention, this FIG. 7 description will next describe the logic flow process for the objects directly involved with the formula utilized for the calculated duration 718. When radio button 716 is selected and a transition event begins (activated by the play next command 212), program instructions will, in a first step, measure the precise aggregate duration of the concerned media file, and that aggregate interval will be at least comprised of a first creative content section and a second silence suffix section. This aggregate duration will be equivalent to the measured duration 710 (i.e., the programmatically retrieved total running time) of a media file.

Next, having ascertained the measured duration 710, program instructions will, at a second step, evaluate the true/false (i.e., checked or unchecked) state of the cold end status check box 240. As illustrated in a first logic process example, the cold end status check box 240 is checked, and the solid cold-end data flow arrow 714 depicts the logic moving from the check box 240 to, at a third step, the selected cold end offset interval value 232 control. From the cold end offset interval value 232 control, a continuation of the solid cold-end data flow arrow 714 depicts, at a fourth step, the calculated duration value 718 control which will hold formula computed interval value.

Alternatively, as a second logic process of the second step, since the cold end status check box 240 could also be unchecked, an unchecked 240 value will cause, in a third step, as illustrated by the broken fade-end data flow arrow 712, the logic process to move to the selected fade end offset interval value 230 control. From the fade end offset interval value 230 control, a continuation of the broken fade-end data flow arrow 712 depicts, at a fourth step, the calculated duration value 718 control which will hold formula computed interval value. The unchecked state of the cold end status check box 240 is not shown in FIG. 7, however the reader is presented with the depiction of the broken fade-end data flow arrow 712 the logic process which illustrates the result of an unchecked 240 box.

Figure 8:
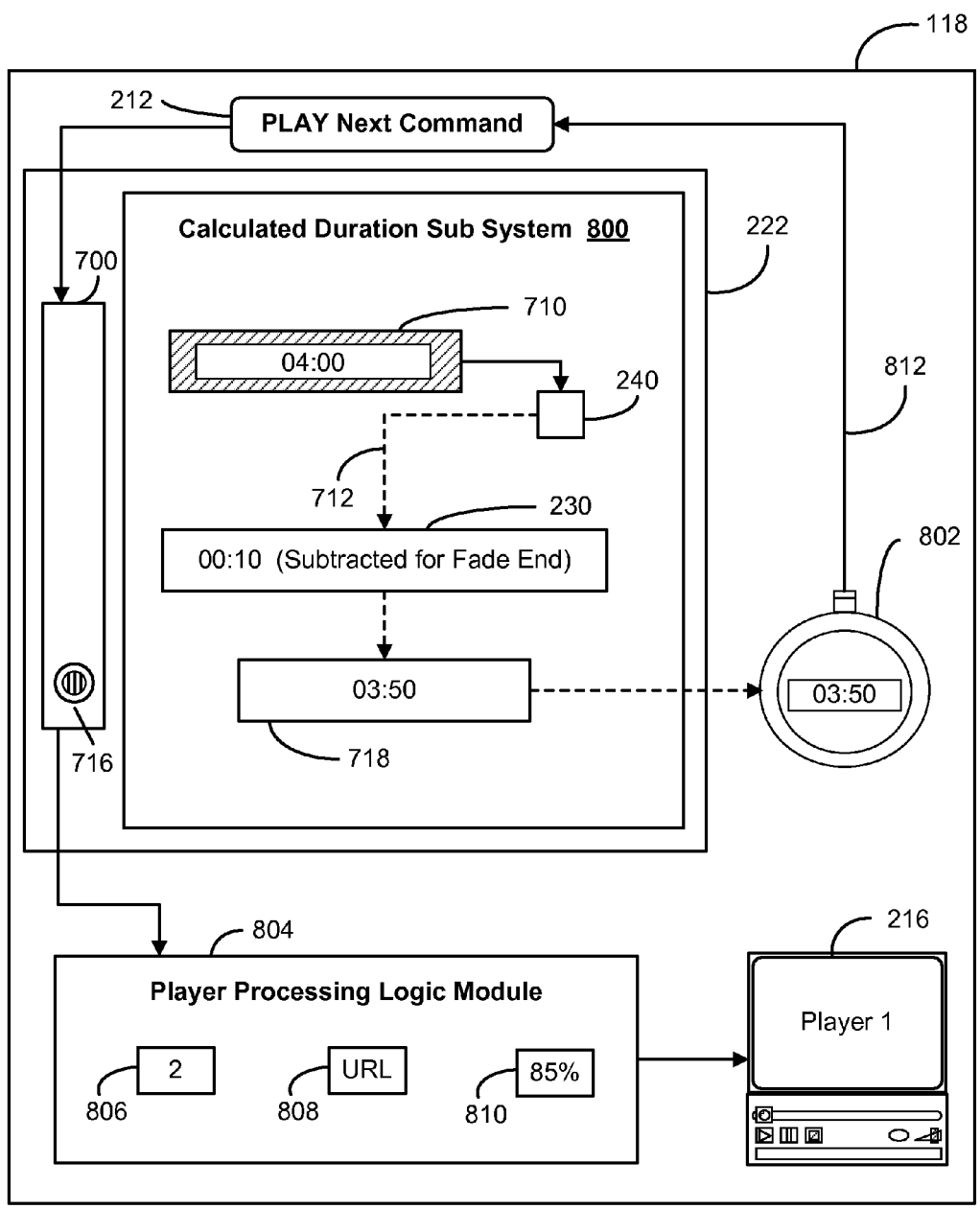
FIG. 8 is a schematic flow chart example depicting the selection of the calculated duration timing mode, and the subsequent control instructions for a fade end media file reproduced in a first system media player.
Figure 9:
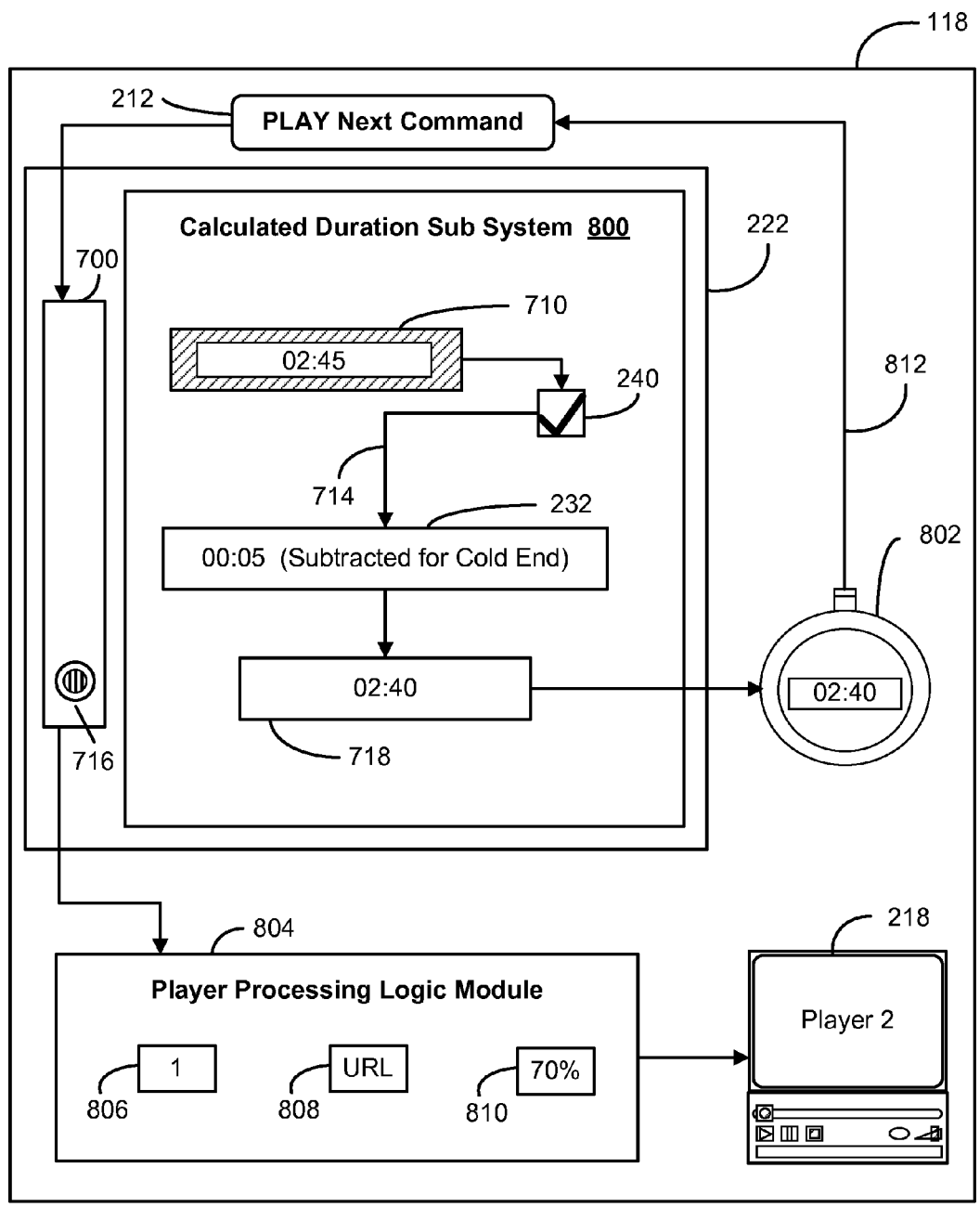
FIG. 9 is a schematic flow chart example depicting the selection of the calculated duration timing mode, and the subsequent control instructions for a cold end media file reproduced in a second system media player.

In the preferred embodiment, the default selected cold end offset interval value 232 will be 5 seconds, and the default selected fade end offset interval value 230 will be 10 seconds. Therefore, the formula utilized to produce the calculated duration value 718, and the formula result, will differ slightly depending on the state of the of the cold end status check box 240. If the check box 240 is checked, the formula will incorporate the cold end offset value 232, or if the check box 240 is unchecked, the formula will instead incorporate the fade end offset value 230. The formula, and sample results, will be described in detail for the next two drawings (FIG. 8 and FIG. 9).

Now referring to the last radio button 720 on the timing protocol logic switch 700. Radio button 720 selects the open-ended duration (advance on silence detection) 722 timing mode. If radio button 702 on the timing protocol logic switch 700 is engaged (i.e., highlighted or selected), activation of the play next command 212, will cause the next transition event to transpire with an open-ended duration 722 which is the equivalent of assigning no duration time to the newly started media file, but to request the system to monitor the play-stop condition of concerned media players. The practical consequence of such a selection will be to operate the system without a declared media file duration, and to let the system automatically advance to the next media file selection after the system has programmatically-detected a player stopped state for the last started player object. To practice the methods and system involving the automatic calculation of optimized digital media durations in the present invention, there is no requirement for an open-ended duration (advance on silence detection) 722 timing mode. Such a mode is only described here as a feature option that may be included in one implementation.

In FIG. 7, the assigned duration value 704, the specified duration value 708, the measured duration value 710, the calculated duration value 718, and open-ended duration value 722 are programming object controls which can hold (i.e., store), and potentially enable UI display or program evaluation of, a specific timing value (i.e., interval). In this specification, a reference to one of these controls may indicate a reference to the software-instantiated control object, or to its value, or to both. For example, in order to enable the automatic and optimal media file duration functionality aspect of the invention, a measured duration value 710 must exist as both a control object which can be addressed by programmed instructions, and as a control object value containing a specific numerical value which is operable for computation by a formula capable of mathematical calculations and interpretations of program declared variables.

Throughout the specification, there are many instances of linked functionality where an identified element, such as a program object control, will also have a value. For example, in FIG. 7, the cold end status check box 240 is a program control object that will also always have a Boolean (i.e., true or false) value. Each specific reference will be made clear by the context of its description.

Due to the nature of the media player objects (MPOs) Player 1 216 and Player 2 218 utilized in the preferred embodiment, it should be stated that while example duration values used in this description may be expressed in minutes or seconds, the MPOs operate with, and respond to, process applied duration values in milliseconds. The preferred embodiment includes mathematical formulas that automatically convert hours, minutes and seconds values to milliseconds as needed, and conversely milliseconds values to hours, minutes and seconds values as needed. Alternative implementations may or may not include such conversion formulas.

Also, in the preferred embodiment, since the system accepts the programmatic or manual activation of the PLAY NEXT command 212, the reproduction duration of any media file (i.e., audio recording) can be shortened (i.e., reduced) if the PLAY NEXT command 212 is activated before the conclusion of a program executed duration value. In other words, in at least one embodiment, users have the option of randomly determining a media file duration, and this will be accomplished whenever a user chooses to start the next transition event by activating the PLAY NEXT command 212 within the graphical user interface.

Now referring to FIG. 8 which is a schematic flow chart depicting the selection of the calculated duration timing mode 718, the computation logic for, in this example, a fade end song (i.e., media file), the assignment of the calculated duration to a play event timer 802, and the subsequent reproduction of a media file in Player 1 216 under the control of the calculated duration value 718, and additional instructions managed by a player processing logic module 804.

The workflow process for FIG. 8 begins in the UI (user interface) of the computer program product (i.e., application) 118. When the user activates the PLAY NEXT command 212, and radio button 716 is selected in the timing control logic switch 700, a play next event will be initiated using the calculated duration timing mode 718. This example assumes a play event is already in progress, and a media file is being reproduced from Player 2 218 at the moment the PLAY NEXT command 212 is activated.

A set of objects collectively referred to as components of the calculated duration sub system 800 is also visible in FIG. 8. These are the objects used to produce and assign the calculated duration value 718 to the play event timer 802, and their relationships will be explained in the following paragraphs. Note that the calculated duration sub system 800 is part of the timing protocol module 222, which is part of the transition execution sub system 220 which is part of the application 118. This is the arrangement for one embodiment, and different implementations may choose to make structure or hierarchy modifications to the various modules and sub systems while still practicing the teachings of the invention.

Having set-up a discussion of the various workflow elements in FIG. 8, a description of the workflow sequence will be explained. Multiple program instructions are processed when the user, or an automated system event, activates the PLAY NEXT command 212. Some instructions are processed concurrently; some are executed after a preceding instruction. In either event, modern processors are so powerful that instructions formed as part of a series of instructions can be implemented within milliseconds, and will appear to execute concurrently.

In this example, activation of the PLAY NEXT command 212 will begin a series of programmed instructions. Workflow moves form the PLAY NEXT command 212 to the timing control logic switch 700, where a timing protocol mode is selected. Before describing that process, the execution of the player processing logic module 804 will be detailed.

At the moment workflow moves to the timing control logic switch 700 it also continues on to the player processing logic module 804 in FIG. 8. This will cause evaluation of values stored in several controls including: the last player started (LPS) control 806, the hyperlink URL (i.e., stored path) control 808, and the volume level auto load (VLA) control 810. In the preferred embodiment, there are many additional controls and program operations in the player processing logic module 804, however, since these other controls are not a part of the illustrated calculated duration aspect of the invention, they do not need to be detailed here. Also, other embodiments may choose not to include controls like the VLA control 810, but this will not prevent those embodiments from using the teachings of the invention.

Continuing with the schematic description for FIG. 8, where the example value stored in the last player started (LPS) control 806 is depicted as the number 2. This number informs the processing logic that, since the LPS is Player 2 218, the play next command 212 should load and start Player 1 216. Accordingly, a hyperlink path associated with a music library 200 media file (i.e. song or music track) record is retrieved from the playlist container 202, which has been populated (i.e., filled) using independent search controls 206 or the load named playlist library command 214. The hyperlink value (i.e., URL path) is immediately assigned (i.e., copied) to the hyperlink URL control 808, and, at the same time, the media file associated with the hyperlink URL control 808 will cause the physical embodiment of the digital media file to be inserted into Player 1 216 (because Player 1 is not the last player started) and reproduction will start. At the same moment, the value of the LPS control will be changed to 1. Additionally, since in this embodiment example, a VLA (volume level auto load) value 810 for the associated media file has been pre-determined as 85 (i.e., 85% of full volume), that data will be simultaneously used to specify the initial audio level of Player 1 216 as 85% (which will override the default value of 80%).

In one embodiment, the preferred embodiment, if the auto fade on check box 228 is checked at the moment the play next command 212 is activated, the system will also begin a "fade to zero" audio level reduction of Player 2 218. To learn more about this aspect the system, review the description for FIG. 2 or locate an explanation of the auto fade on check box 228 elsewhere in the specification.

Still referring to FIG. 8, another action concurrently activated by the PLAY NEXT command 212 will recognize that radio button 716 is selected in the timing control logic switch 700, and the play next event will utilize the calculated duration timing mode 718. Accordingly, program instructions will retrieve the measured duration 710 of the media file (just started and) currently playing in Player 1 216. Next, a calculated content duration (CCD) formula designed to extrapolate an estimate of the creative content section interval of the Player 1 media file will be executed. The composition of the CCD formula will depend on the state of the CES (i.e., cold end status) check box 240.

Since, in this example, the CES (i.e., cold end status) check box 240 is unchecked (i.e., Boolean false value), the system will recognize that the database administrator (or music library editor) has specified that the selected and current Player 1 media file does not have a cold (i.e., abrupt level reduction) end, and therefore it resolves instead with a fade (i.e., gradual level reduction) ending.

In FIG. 8, the broken fade-end data flow arrow 712 illustrates the logic timing process moving from check box 240 to the selected fade end offset interval value 230 control which has been assigned a pre-determined value that will apply globally, in this embodiment, to all fade end songs managed by the calculated duration 718 timing mode (and possibly other modes). For this example, assume the fade end offset interval value 230 has been specified in the system as 10 seconds (i.e., 10,000 milliseconds). The fade end offset interval value 230 will be subtracted from the media file's specific measured duration 710 (already retrieved) in order to estimate the calculated duration 718 of the creative content section (i.e., the first section) of the media file. As is explained in detail elsewhere in this specification, the creative content section is the artistically designed first section of a digital media file, and therefore the section deemed desirable and suitable for audible presentation by the system.

Still referring to FIG. 8 where the following calculated content duration (CCD) formula (i.e., calculated duration) for this fade end media file example will be formed in program structures communicatively connected with the processor 102. (Note: all CCD formula values will be numbers computed as milliseconds):

Measured Duration Value 710 MINUS the predetermined Fade End Offset Interval Value 230 EQUALS the Calculated Duration Value 718.

For this example, the measured duration value 710 will be specified as 4 minutes (i.e., 240,000 milliseconds). Therefore, subtracting the fade end offset interval value 230 of 10 seconds (i.e., 10,000 milliseconds) from 240,000 milliseconds returns a calculated duration 718 sum equal to 230,000 milliseconds—or 3 minutes and 50 seconds (which is depicted in the drawing as 03:50).

Continuing with the workflow process in FIG. 8 where the calculated duration 718 of the creative content section is assigned to the play event timer 802 object, and a command to start countdown of the play event timer 802 is concurrently initiated. Observe that the play event timer 802 object is depicted with a matching calculated duration 718 value of 03:50.

Unless the user (i.e., operator) elects to manually advance timing by activating the play next command 212, the normal automated process of the system will be to allow the current play event (namely the audio stream reproduced from Player 1) to continue playing until a moment (i.e., point in time) coinciding with the elapsed interval of the play event timer 802. In other words, in this example, when the play event timer 802 has counted down from 03:50 to 00:00 (or zero milliseconds), the system will activate the play next command, and start the next transition event.

This aspect is illustrated by the solid data flow arrow 812 which depicts the timer process moving from the play event timer 802 to the play next command 212. This demonstrates that the systems and methods of the invention control media file duration, not any enforced action or property of the media player object or the player's loaded and playing media file.

Player 1 216 can accept both fade end and cold end media files, and the player is not concerned with which end style it loads and plays. The example used in FIG. 8 depicts a fade end media file like that illustrated as the audio track output volume level 500 of FIG. 5.

Now referring to FIG. 9 which is a schematic flow chart depicting the selection of the calculated duration timing mode 718, the computation logic for, in this example, a cold end song (i.e., media file), the assignment of the calculated duration to a play event timer 802, and the subsequent reproduction of a media file in Player 2 218 under the control of the calculated duration value 718, and additional instructions managed by a player processing logic module 804.

The workflow process for FIG. 9 begins in the UI (user interface) of the computer program product (i.e., application) 118. When the user activates the PLAY NEXT command 212, and radio button 716 is selected in the timing control logic switch 700, a play next event will be initiated using the calculated duration timing mode 718. This example assumes a play event is already in progress, and a media file is being reproduced from Player 1 216 at the moment the PLAY NEXT command 212 is activated.

A set of objects collectively referred to as components of the calculated duration sub system 800 is also visible in FIG. 9. These are the objects used to produce and assign the calculated duration value 718 to the play event timer 802, and their relationships will be explained in the following paragraphs. Note that the calculated duration sub system 800 is part of the timing protocol module 222, which is part of the transition execution sub system 220 which is part of the application 118. This is the arrangement for one embodiment, and different implementations may choose to make structure or hierarchy modifications to the various modules and sub systems while still practicing the teachings of the invention.

Having set-up a discussion of the various workflow elements in FIG. 9, a description of the workflow sequence will be explained. Multiple program instructions are processed when the user, or an automated system event, activates the PLAY NEXT command 212. Some instructions are processed concurrently; some are executed after a preceding instruction. In either event, modern processors are so powerful that instructions formed as part of a series of instructions can be implemented within milliseconds, and will appear to execute concurrently.

In this example, activation of the PLAY NEXT command 212 will begin a series of programmed instructions. Workflow moves form the PLAY NEXT command 212 to the timing control logic switch 700, where a timing protocol mode is selected. Before describing that process, the execution of the player processing logic module 804 will be detailed.

At the moment workflow moves to the timing control logic switch 700 it also continues on to the player processing logic module 804 in FIG. 9. This will cause evaluation of values stored in several controls including: the last player started (LPS) control 806, the hyperlink URL (i.e., stored path) control 808, and the volume level auto load (VLA) control 810. In the preferred embodiment, there are many additional controls and program operations in the player processing logic module 804; however, since these other controls are not a part of the illustrated calculated duration aspect of the invention, they do not need to be detailed here. Also, other embodiments may choose not to include controls like the VLA control 810, but this will not prevent those embodiments from using the teachings of the invention.

Continuing with the schematic description for FIG. 9, where the example value stored in the last player started (LPS) control 806 is depicted as the number 1. This number informs the processing logic that, since the LPS is Player 1 216, the play next command 212 should load and start Player 2 218. Accordingly, a hyperlink path associated with a music library 200 media file (i.e. song or music track) record is retrieved from the playlist container 202, which has been populated (i.e., filled) using independent search controls 206 or the load named playlist library command 214. The hyperlink value (i.e., URL path) is immediately assigned (i.e., copied) to the hyperlink URL control 808, and, at the same time, the media file associated with the hyperlink URL control 808 will cause the physical embodiment of the digital media file to be inserted into Player 2 218 (because Player 2 is not the last player started) and reproduction will start. At the same moment, the value of the LPS control will be changed to 2. Additionally, since in this embodiment example, a VLA (volume level auto load) value 810 for the associated media file has been pre-determined as 70 (i.e., 70% of full volume), that data will be simultaneously used to specify the initial audio level of Player 2 218 as 70% (which will override the default value of 80%).

In one embodiment, the preferred embodiment, if the auto fade on check box 228 is checked at the moment the play next command 212 is activated, the system will also begin a "fade to zero" audio level reduction of Player 1 216. To learn more about this aspect the system, review the description for FIG. 2 or locate an explanation of the auto fade on check box 228 elsewhere in the specification.

Still referring to FIG. 9, another action concurrently activated by the PLAY NEXT command 212 will recognize that radio button 716 is selected in the timing control logic switch 700, and the play next event will utilize the calculated duration timing mode 718. Accordingly, program instructions will retrieve the measured duration 710 of the media file (just started and) currently playing in Player 2 218. Next, a calculated content duration (CCD) formula designed to extrapolate an estimate of the creative content section interval of the Player 2 media file will be executed. The composition of the CCD formula will depend on the state of the CES (i.e., cold end status) check box 240.

Since, in this example, the CES (i.e., cold end status) check box 240 is checked (i.e., Boolean true value), the system will recognize that the database administrator (or music library editor) has specified that the selected and current Player 2 media file has a cold (i.e., abrupt level reduction) end, and therefore it does not resolve with a fade (i.e., gradual level reduction) ending.

The solid cold-end data flow arrow 714 illustrates the logic timing process moving from check box 240 to the selected cold end offset interval value 232 control which has been assigned a pre-determined value that will apply globally, in this embodiment, to all cold end songs managed by the calculated duration 718 timing mode (and possibly other modes). For this example, assume the cold end offset interval value 232 has been specified in the system as 5 seconds (i.e., 5,000 milliseconds). The cold end offset interval value 232 will be subtracted from the media file's specific measured duration 710 (already retrieved) in order to estimate the calculated duration 718 of the creative content section (i.e., the first section) of the media file. As is explained in detail elsewhere in this specification, the creative content section is the artistically designed first section of a digital media file, and therefore the section deemed desirable and suitable for audible presentation by the system.

Still referring to FIG. 9 where the following calculated content duration (CCD) formula (i.e., calculated duration) for this cold end media file example will be formed in program structures communicatively connected with the processor 102. (Note: all CCD formula values will be numbers computed as milliseconds):

Measured Duration Value 710 MINUS the predetermined Cold End Offset Interval Value 232 EQUALS the Calculated Duration Value 718.

For this example, the measured duration value 710 will be specified as 2 minutes and 45 seconds (i.e., 165,000 milliseconds). Therefore, subtracting the cold end offset interval value 232 of 5 seconds (i.e., 5,000 milliseconds) from 165,000 milliseconds returns a calculated duration 718 sum equal to 160,000 milliseconds—or 2 minutes and 40 seconds (which is depicted in the drawing as 02:40).

Continuing with the workflow process in FIG. 9 where the calculated duration 718 of the creative content section is assigned to the play event timer 802 object, and a command to start countdown of the play event timer 802 is concurrently initiated. Observe that the play event timer 802 object is depicted with a matching calculated duration 718 value of 02:40.

Unless the user (i.e., operator) elects to manually advance timing by activating the play next command 212, the normal automated process of the system will be to allow the current play event (namely the audio stream reproduced from Player 2) to continue playing until a moment (i.e., point in time) coinciding with the elapsed interval of the play event timer 802. In other words, in this example, when the play event timer 802 has counted down from 02:40 to 00:00 (or zero milliseconds), the system will activate the play next command, and start the next transition event.

This aspect is illustrated by the solid data flow arrow 812 which depicts the timer process moving from the play event timer 802 to the play next command 212. This demonstrates that the systems and methods of the invention control media file duration, not any enforced action or property of the media player object or the player's loaded and playing media file.

Player 2 218 can accept both fade end and cold end media files, and the player is not concerned with which end style it loads and plays. The example used in FIG. 9 depicts a cold end media file like that illustrated as the audio track output volume level 600 of FIG. 6.

Figure 10:
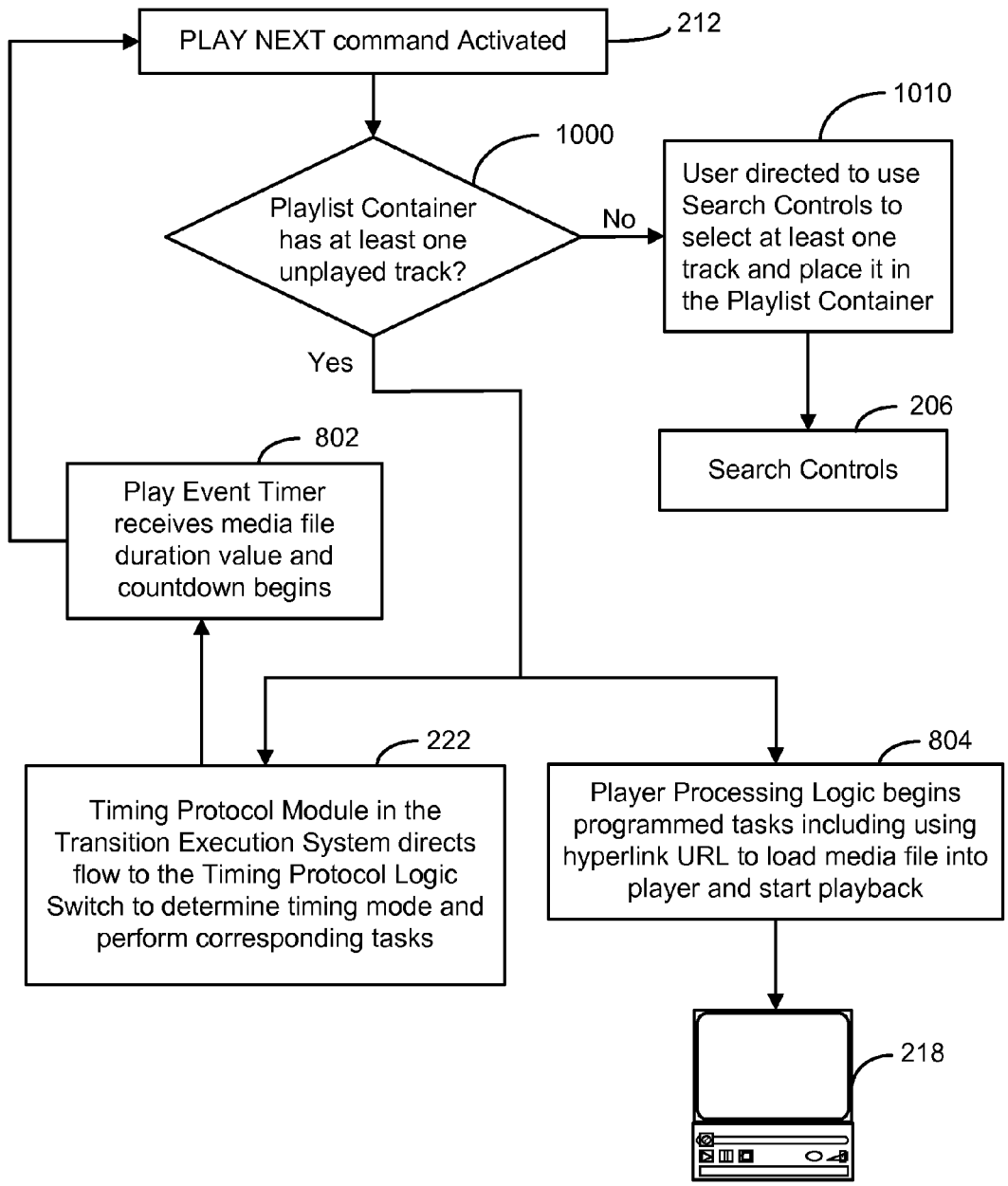
FIG. 10 is a flow chart diagram illustrating, in this example, at least two separate program instruction processes that occur when the play next command button is activated in order to begin a transition between two discrete media files.

Turning now to a description of FIG. 10 which is a flow chart diagram illustrating, in this example, at least two separate program instruction processes that occur when the play next command button 212 is activated. In this example, it should be known that the play next command is activated at a time when the LPS is Player 1 216, and therefore the next play event will start Player 2 218.

In FIG. 10, after manual activation by the user or automated activation by the system, the play next command 212 will perform an evaluation 1000 that determines whether the playlist container 202 (as depicted in FIG. 2) contains at least one unplayed song (i.e., audio file). If at least one unplayed track (i.e., song) is not available in the playlist container, the user will be message directed 1010 to use the application 118 search controls 206 (or other playlist assignment method) to select at least one track form the music library 200, and place it in the playlist container. However, if one or more tracks are available in the playlist container, a parallel process (or a process that executes so quickly it performs like a parallel process) will move to the timing protocol module 222 and the player processing logic module 804.

Before describing the first parallel process illustrated in FIG. 10, it can be helpful to understand more about the playlist container 202 included in the preferred embodiment, and how it improves the efficiency of playlist content manipulation.

Another benefit of using a playlist container object 202 can be understood from certain functionality in the preferred embodiment which permits users to modify and reorder playlist content. Since the playlist container can be maintained in separate content blocks, it permits users to "block delete" assigned tracks (i.e., media files).

For example, if the playlist container is filled with 30 tracks, the user can choose to delete all tracks, delete individual tracks, or to delete a block (i.e., group) of tracks. To explain, assume a playlist container is instantiated with 30 positions (holding key data for 30 media files), and all 30 positions are filled. In the preferred embodiment, if playlist container positions 15 through 30 are deleted, for instance, with a click of a Delete Positions 15-30 command button, those positions become available for insertion of newly selected media files. The selections can be produced by various methods including search-control selections, or match-batch processing, or load named playlist command clicks. With the concept of independent position (i.e., track holding) blocks including at least two or more separately addressable groups, the playlist container allows the user to retain some originally selected playlist container content while quickly modifying other sections. The playlist container is not required to have 30 media file positions. Alternative embodiments can choose to execute its functionality with fewer or more positions.

In the preferred embodiment, the playlist container 202 also permits manual or programmatic flow (i.e., selection order) modifications without interrupting the normal play (i.e., reproduction) of any media file. For example, with 30 filled playlist container positions (in other words, if the user has selected 30 media files and placed them in the playlist container), and where the system is currently playing a track from position 9 in Player 1 216, the default flow order is to transition next to position 10 played from Player 2 218.

However, the playlist container permits manual flow order modification. A Set Next Position command can be used to instruct the play next 212 event transition, when it is activated by the play event timer 802 or manually by the user, to execute from a first media file (the track from playlist container position 9) to, for example, a second media file from playlist container position 22 (instead of from position 10). Alternatively, a Set Next Position command can be used to instruct the play next 212 event transition to execute from a first media file playing content from, for example, playlist container position 9 to a second media file retrieved from playlist container position 8. In the preferred embodiment, using two instantiated media player objects, the playlist container always transition from odd-numbered position tracks, played by Player 1 216, to even-numbered position tracks played by Player 2 218.

With the playlist container design, changing the flow order of selected tracks does not affect the assigned interval of the play event timer 802.

Different embodiments with additional media players may choose to alter the media player object sequencing. Alternative playlist container embodiments can be envisioned with supplementary functionality. For example, in addition to delete all, delete block (i.e., group), and delete discrete (i.e., individual) playlist container track buttons (i.e., commands), a delete random track positions button, or a delete every other track position button, can be imagined. Also, a Random Rearrange Position Content Order button can be envisioned to add shuffle functionality to the playlist maintained flow order (as a supplement to the previously mentioned transition-executed random flow order). Additionally, a Save Playlist Order As Named Playlist Library Image (i.e., playlist container grouped and named database subset) command, and other playlist manipulation commands, can be envisioned.

The playlist container 202 also permits the example of the preferred embodiment to offer optional "shuffle" (i.e., programmatically determined random order sequencing) and repeat (i.e., recycle entire playlist) modes. Other embodiments may choose not to include shuffle or repeat features, but embodiments using an independent playlist container, instead of concurrently loading or maintaining a multi-file playlist in a media player, are still practicing this aspect of the invention. The same stipulation is valid for the playlist container concept of separately addressable media file blocks (i.e., groups). Alternative embodiments may choose not to implement separately addressable media file blocks in the playlist container, and they may also elect to implement varying numbers of separately addressable media file blocks.

Continuing now in FIG. 10 with a description of a first parallel process where the timing protocol module 222 directs flow to the timing protocol logic switch 700 in order to determine the selected timing mode and perform operations related to the corresponding timing mode. From there, the appropriate media file duration is assigned (i.e., copied) to the play event timer 802 which begins a countdown to zero. When the play event timer reaches zero, the system returns to the play next command 212 which will be activated, and the next play event transition will begin.

In a second parallel process activated by the play next command 212, logic workflow is directed to the player processing logic module 804 which will execute programmed tasks including using a media file's associated hyperlink URL 808 to load a digital file into, in this example, Player 2 218 and begin playback (i.e., reproduction).

Figure 11:
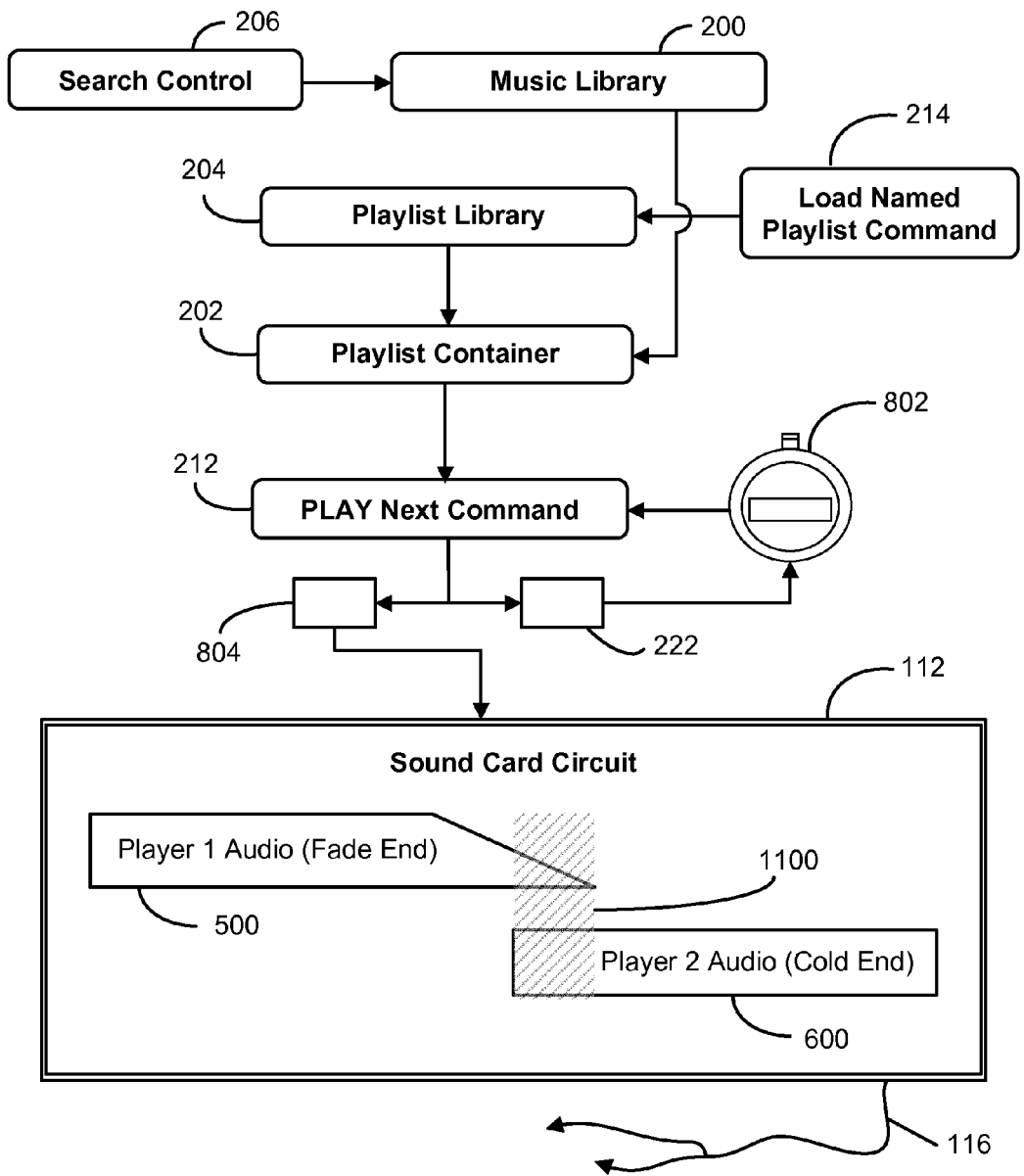
FIG. 11 is a flow chart depicting sequential logic processing beginning with a search media file action, and resolving with a visual depiction of concurrent overlapping audio track output streams mixed in a sound card circuit as enabled by the invention.

Now referring to FIG. 11 which is a flow chart depicting sequential logic processing beginning with a search media file action, and resolving with a visual depiction of concurrently overlapping audio track output streams mixed in a sound card circuit as enabled by the invention.

From the application 118, a search control 206 permits the user to browse (i.e., examine the contents of) a music library 200 and select a named (titled) audio recording (i.e., song or music track) which contains an associated hyperlink. The selected track is placed in the playlist container 202. As an alternative, in this example, a search control enables selecting a pre-named playlist library 204 collection (i.e., playlist) and placing the named library collection (which will generally contain a plurality of media files) into the playlist container 202.

In either event, the play next command 212 when activated will perform as detailed in this specification and move workflow to the player processing logic module 804 and the timing protocol module 222. In the timing protocol module 222, for this example, the calculated duration 716 radio button has selected the calculated duration 718 mode. From the player processing logic module 804 the illustration moves to the sound card circuit 112 which is part of the system 100.

This example depicts a sound card mixed transition event including a first media file audio track output stream 500 having a fade end style playing from a first media player such as Player 1. In order to visually depict how the invention enables presentation of a concurrent overlapping second media file, at a moment that occurs before the audio level of the first section of a first media file has completely faded out, a second media file audio track output stream 600 is visible. Observe that the second media file audio track output stream 600 is positioned to start while the first section of the first media file is fading. Please refer to FIG. 5, and its detailed description, for a more detailed view of the media file audio track output stream 500, and its notable time calibration markers.

The shaded overlap interval 1100 is included in order to visually demonstrate a period of time when the appropriate creative content section audio streams from two discrete media files can be heard by the listener when, for example, the sound card 112 output is connected via cables 116 to a powered loudspeaker. Note: In this example, the media file audio track output stream 600 (used as an example of a second media file) is depicted as having a cold ending. However, the media file content of the second file could instead have a fade ending.

Continuing with FIG. 11, the timing protocol module 222 moves workflow to the play event timer 802, and when the play event timer 802, reaches the end of its programmed countdown time (i.e., the assigned calculated duration interval has elapsed), logic next moves to the play next command 212.

Figure 12:
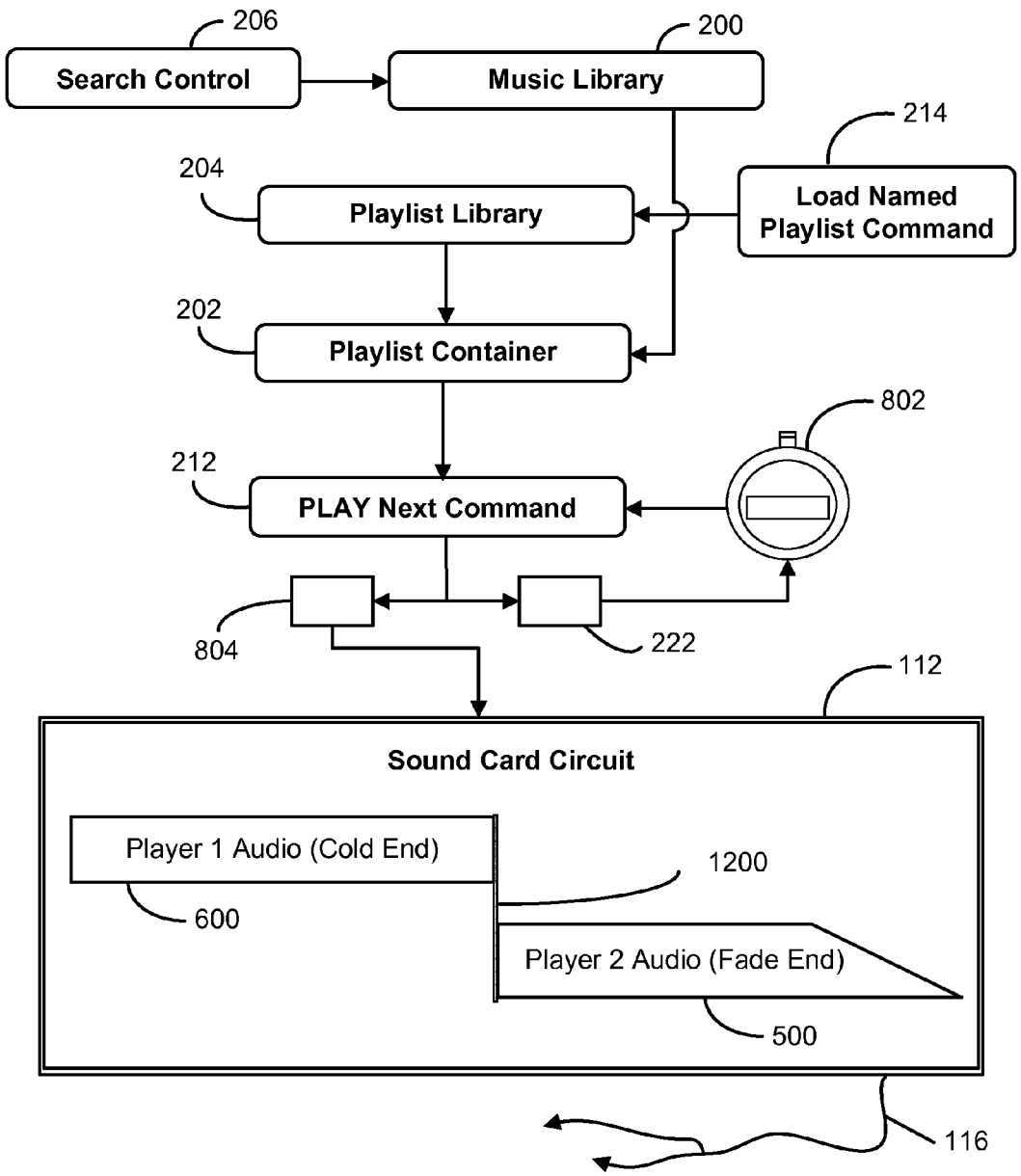
FIG. 12 which is a flow chart depicting sequential logic processing beginning with a search media file action, and resolving with a visual depiction of concurrent adjoined audio track output streams mixed in a sound card circuit as enabled by the invention.

Now referring to FIG. 12 which is a flow chart depicting sequential logic processing beginning with a search media file action, and resolving with a visual depiction of concurrently adjoined audio track output streams mixed in a sound card circuit as enabled by the invention.

From the application 118, a search control 206 permits the user to browse (i.e., examine the contents of) a music library 200 and select a named (titled) audio recording (i.e., song or music track) which contains an associated hyperlink. The selected track is placed in the playlist container 202. As an alternative, in this example, a search control enables selecting a pre-named playlist library 204 collection (i.e., playlist) and placing the named library collection (which will generally contain a plurality of media files) into the playlist container 202.

In either event, the play next command 212 when activated will perform as detailed in this specification and move workflow to the player processing logic module 804 and the timing protocol module 222. In the timing protocol module 222, for this example, the calculated duration 716 radio button has selected the calculated duration 718 mode. From the player processing logic module 804 the illustration moves to the sound card circuit 112 which is part of the system 100.

This example depicts a sound card mixed transition event including a first media file audio track output stream 600 having a cold end style playing from a first media player such as Player 1. In order to visually depict how the invention enables presentation of adjoined audio streams, at a moment that occurs when the audio level of the first section of a first media file has just ended, a second media file audio track output stream 500 is visible. Observe that the second media file audio track output stream 500 is positioned to start at a point where the first section of the first media file has just concluded. Please refer to FIG. 6, and its detailed description, for a more detailed view of the media file audio track output stream 600, and its notable time calibration markers.

The overlap interval 1200 is included as a thin solid line in order to visually demonstrate a period of time when the appropriate creative content section audio streams from two discrete media files are audibly distinguished as adjoined by the listener when, for example, the sound card 112 output is connected via cables 116 to a powered loudspeaker. Note: In this example, the media file audio track output stream 500 (used as an example of a second media file) is depicted as having a fade ending. However, the media file content of the second file could instead have a cold ending.

Continuing with FIG. 12, the timing protocol module 222 moves workflow to the play event timer 802, and when the play event timer 802, reaches the end of its programmed countdown time (i.e., the assigned calculated duration interval has elapsed), logic next moves to the play next command 212.

Figure 13:
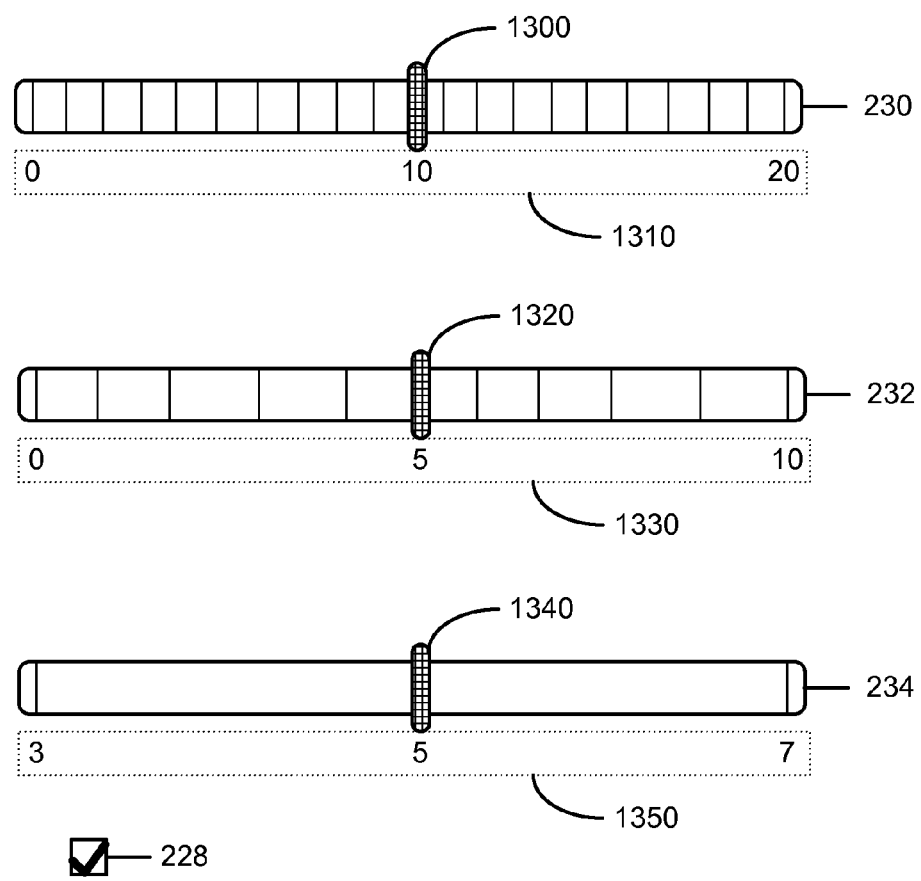
FIG. 13 is an example of how the UI (user interface) controls in the fade control sub system are implemented in one embodiment, which, in this case, is also the preferred embodiment.

Next, the description refers to FIG. 13, an example of how the UI controls in the fade control sub system 226 are implemented in one embodiment, which is, in this case, the preferred embodiment. Observe that the fade control sub system 226 is implemented as part of the container application 118.

The fade end offset interval control 230 is a user adjustable slider control with incremental markings to indicate varying degrees of interval offset values. The fade end offset control selects the pre-determined interval which the calculated duration 718 formula of the system will subtract from a media file's full length (i.e., measured duration 710) when the media file is recognized by the system as having a fade (i.e., gradually reduced level) end. Depicted immediately below the fade end offset control 230 is its calibration label 1310 which includes three numbers: 0, 10, and 20. Each number represents the control's selected fade end offset value in seconds.

The default setting for the preferred embodiment is 10 seconds, and this is indicated by the position of the fade end offset control slide button 1300 which is placed over the 10 second marker. When the user moves the fade end offset control slide button 1300 to the left, the formula applied fade end offset value interval is reduced in increments; and it can be reduced to zero in this example. Conversely, moving the fade end offset control slide button 1300 to the right increases the interval of "back time adjustment" (i.e., the interval value that is subtracted from a media file's full length measured duration). In this example, it can be increased to as much as 20 seconds. Alternative embodiments may choose to implement a fixed length pre-determined fade end offset interval, or they may be created with a different range of fade end offset values.

Also visible in FIG. 13, is the cold end offset interval control 232. It too is a user adjustable slider control with incremental markings to indicate varying degrees of interval offset values. The cold end offset control selects the pre-determined interval which the calculated duration 718 formula of the system will subtract from a media file's full length (i.e., measured duration 710) when the media file is recognized by the system as having a cold (i.e., abrupt) end. Depicted immediately below the cold end offset control 232 is its calibration label 1330 which includes three numbers: 0, 5, and 10. Each number represents the control's selected fade end offset value in seconds.

The default setting for the preferred embodiment is 5 seconds, and this is indicated by the position of the cold end offset control slide button 1320 which is placed over the 5 second marker. When the user moves the cold end offset control slide button 1320 to the left, the formula applied cold end offset value interval is reduced in increments; and it can be reduced to zero in this example. Conversely, moving the cold end offset control slide button 1320 to the right increases the interval of "back time adjustment" (i.e., the interval value that is subtracted from a media file's full length measured duration). In this example, it can be increased to as much as 10 seconds. Alternative embodiments may choose to implement a fixed length pre-determined cold end offset interval, or they may be created with a different range of cold end offset values.

Continuing with FIG. 13, where the fade duration and slope control module 234 slider control is illustrated. It too is a user adjustable slider control with incremental markings to indicate varying degrees of interval offset values.

The fade duration and slope control module 234 slider selects the pre-determined interval for the length of an automatically applied system transition fade. This is not the same interval used to calculate the first section interval of a media file. The fade duration and slope control module 234 is not concerned with media file duration, and instead it only controls the duration of any fade operations executed as part of a transition. Depicted immediately below the fade duration and slope control module 234 is its calibration label 1350 which includes three numbers: 3, 5, and 7. Each number represents the control's selected fade duration value in seconds.

The default setting for the preferred embodiment is 5 seconds, and this is indicated by the position of the fade duration and slope control slide button 1340 which is placed over the 5 second marker. When the user moves the fade duration and slope control slide button 1340 to the left, the formula applied fade duration interval is reduced in increments; and it can be reduced to 3 in this example. Conversely, moving the fade duration and slope control slide button 1340 to the right increases the interval of fade window (i.e., duration). In this example, it can be increased to as much as 7 seconds. Alternative embodiments may choose to implement a fixed length fade duration interval, or they may be created with a different range of fade duration values.

Also included in this embodiment, but not a requirement of every embodiment, are program fade slope calculation formulas that are paired with the selected fade duration. A fade slope in this example refers to the degree of volume level reduction that occurs with each passing second of an elapsing fade duration event (which is part of a system-executed transition event). In the preferred embodiment, a fade duration interval of 3 seconds also applies an aggressive fade slope value; while a fade duration interval of 5 seconds uses a moderate fade slope value and a fade duration interval of 7 seconds executes with a mild fade slope value. Other embodiments may use different fade slope formulas.

Finally in FIG. 13 the auto fade on check box 228 is depicted. When checked, auto fade duration values as described above will be implemented by the system. When unchecked, the level reductions will not be automatically applied. However, for this example embodiment, the state of this check box 228 does not impact the calculated duration 718 interval determined for any file as part of any system implemented transition. The auto fade on check box 228 value, whether true (on) or false (off), also does not affect system transitions executed with different timing protocols such as the assigned duration 704, specified duration 708, or an open-ended transition 722. Other embodiments may choose to invoke different programming options, but they will still practice the invention set forth in this disclosure.

Figure 14:
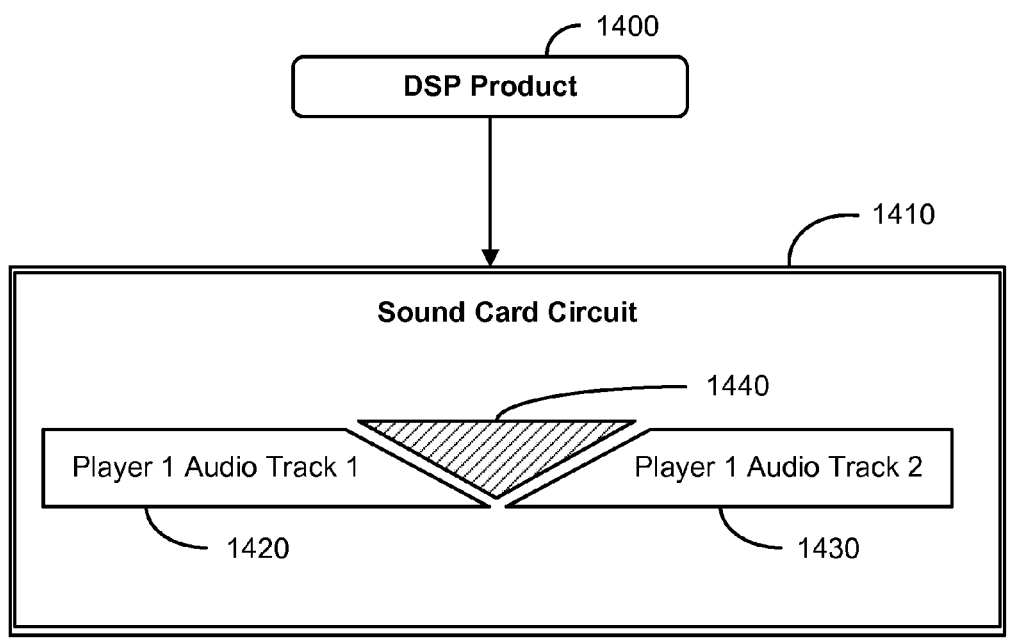
FIG. 14 depicts an example of how a DSP (digital signal processing) type cross fade mixing product (which is an example of prior art and not a part of the present invention) can cause an audio track output stream transition to execute with a forced fade out of the first media file, followed by a forced fade in of a second media file.

Next, the description refers to FIG. 14 which depicts an example of how a DSP (digital signal processing) type "cross fade" mixing product, circuit or device might typically cause an audio track output stream transition to execute with a forced fade out of the first media file, followed by a forced fade in of a second media file. This is an example of an unwanted transition effect which is overcome by the practice of the invention. And the type of transition implementation illustrated by FIG. 14 is an example of prior art and not a part of, and not a byproduct of, the present invention.

In FIG. 14, a DSP cross fade mixing product 1400 (which could be implemented in a software program, an integrated circuit, an electronics apparatus, or other form) is illustrated as producing an audio track output stream comprised of sections of at least two media files which are visually depicted in a sound card circuit 1410 which is not the same sound card circuit 112 utilized by the invention.

This example is intended to illustrate a different audio file presentation; an effect that might be executed on a platform or device which is not the illustrated system 100 of the preferred embodiment. However, the sound card circuit 1410 in this example is functionally identical to the sound card circuit 112 utilized by the invention.

In the sound card circuit 1410 of this DSP product example, which implements a "cross fade" transition between two discrete digital media files in a single media player, the reader will see the audio track output of a first media file 1420, and the audio track output of a second media file 1430. Whether or not the sound design of the first media file 1420 resolves with a fade end, this DSP example will cause the media file to conclude with a fade ending. And, even though a second media file 1430 will almost never start with a fade in, this DSP example will cause the media file to start with an audio level that fades in.

When visually depicted as adjacent audio streams in the sound card circuit 1410, it can be observed that the effect of such a DSP design will be to produce a so-called "V-notch" between the fade out and fade in of the media files. The V-notch area 1440 of adjacent audio reduction and audio increase is depicted as a shaded interval. Compare the unnatural presentation of this V-notch 1440 effect from FIG. 14 with the concurrent overlapping transition 1100 in FIG. 11 made possible by practice of the invention.

In the preferred embodiment, the application has been developed primarily using the Microsoft® Visual Basic® for Applications (VBA) programming language that is provided in the IDE (integrated development environment) included with the Microsoft® Access™ database program. Since Microsoft Access powers the preferred embodiment, the embodiment will operate on a Windows® operating system computing device utilizing a Microsoft Access shell program. Other embodiments, implemented with different operating systems, and different program languages for integration with different computing device platforms, are possible.

Throughout the specification the terms "song" and "track" are interchangeably used and their meaning shall be intended to be synonymous with the term "audio recording". These terms are often used in place of terms such as media files or audio files, or digital audio recordings, yet all terms have essentially the same meaning Accordingly, the term "hit-music track" should be construed to describe an audio recording that has been made popular in the public culture by means of mass availability, repeated exposure, many recommendations by interactive Web-based consumers and, possibly, high sales or download statistics. Also in this specification, like reference symbols in the various drawings indicate like elements.

It is important to state that alternate embodiments can be envisioned for a variety of operating systems and hardware devices. The disclosure and inventive concepts could easily be adapted by parties skilled in the art of computer programming and hardware apparatus integration. While Microsoft VBA is the primary development language for the preferred embodiment, alternative embodiments created in different computer programming languages that exist today, or might be created in the future, can be anticipated.

Such operating systems might include the Apple® OS, with hardware-specific accommodations for at least these Apple Inc. products: iPod®, iPad®, and Macbook® computer. Tablet devices with media player capability from manufacturers like Samsung®, Sony®, Asus®, and BlackBerry® could also be implemented using the invention's disclosure. Digital display devices like products from Barnes & Noble® (such as the Nook™) or Amazon® (such as the Kindle™) might also be adapted to reproduce digital audio and utilize the teachings of the invention.

Desktop systems, portable music and tablet devices, or smartphones created for any one of the many Linux operating system variants might also be used as a platform for the designs described in this specification. The invention might be adapted for use as part of a Web-based (i.e., Internet) implementation, or on a LAN (local area network), peer group network, or wireless network; and for terrestrial broadcasting including sub channel implementations, or for incorporation in a satellite delivered music system.

Embodiments built on any or all of the three major mobile phone platforms—Android®, BlackBerry®, and iOS®—can also be envisioned. This strategy would make the invention's technology available to millions of smartphone devices. Other mobile phone devices and operating systems available now, or in development, or contemplated in the future, could also be used for implementations of the techniques disclosed in this specification.

It should be noted that, while the disclosed preferred embodiment will depict implementation of the invention on a personal computer, the invention can also be envisioned for adaptation and deployment on other computing devices, and with an assortment of hardware and software platforms. Additionally, various hardware or software implementations can be conceived where the invention's core functionality can be reproduced in software routines or with integrated circuits, memory storage devices, and microprocessors for inclusion in what could be a mixture of designs for hardware apparatus. Such apparatus may take form as analog or digital audio/video mixers, home entertainment music servers, commercially marketed digital juke boxes, broadcast operations equipment, police, fire, military or security devices, or some other device.

A security-enhancement application (i.e., purpose) is an alternative implementation that may seem far removed from the preferred embodiment detailed in this specification. However, it may be beneficial to describe such a concept here, in order to illustrate the potential value of the technology. To that end, here is an example of an embodiment envisioned for persons or installations interested in implementing preventive security through what might be called an "audio obfuscation" scenario.

In the way that an absentee homeowner might program several light timers to make it appear that there is activity within his home, an audio device using the teachings of the invention could be designed to reproduce various types of content, at staggered times of the day or night, to make it sound as if a home, building, work space, or other area was inhabited. Such content might include general recordings of household and office noises, various sound effects, factory or warehouse sounds including mechanized devices, snippets of conversations and laughter, occasional coughs, television or radio audio excerpts, and so on.

The technology in the disclosed invention could be adapted to include timed and overlapping or adjoined playback of audio tracks, at varying audio levels, and possibly interspersed with an interval of recorded silence. The objective of such an embodiment could be to make it sound to a person on the outside as if a home, building, class room, office space, etc. was inhabited. This effect could be emphasized if the computing device or electronic apparatus that executed the methods and systems of the invention also offered random and programmed selection of audio content from effective sound effects and other audio files. Effectiveness could be enhanced if the embodiment also included synchronization with an interior or exterior light control system. The concepts in this disclosure could help present the illusion that a vacant building, living space, office, military zone, jail cell, meeting hall, etc. was occupied by a small or larger number of persons. This would improve the implementation of security systems.

This specification is primarily concerned with manipulation of audio only digital media files. However, alternative embodiments of the invention could be envisioned where the disclosed technology might be adapted to work well with digital media files comprised of audio and video content. Alternative embodiments could also be integrated with live sound or video presentations including concerts, worship venues, shareholder meetings, and charitable events.

This list of alternative embodiments cited is not exhaustive, and the potential for utilizing the invention should not be limited to hardware and operating systems mentioned here. For example, Web-hosted implementations incorporating some, many or all cited aspects can be conceived.

While illustrated embodiments of the present invention have been described and illustrated in the appended drawings, the present invention is not limited thereto but only by the scope and spirit of the appended claims.

I claim:

1. A method for sequentially playing at least first and second songs upon a single device, the method comprising the steps of:
   instantiating first and second media players, each player having an independent audio stream output;
   commanding the first media player to start playing a first song;
   automatically determining a total measured duration interval of the first song;
   storing, without association with any song or media player, at least one predetermined silence suffix interval;
   automatically subtracting, from the total measured duration interval, the at least one predetermined silence suffix interval to obtain, for the first song, a calculated creative content interval;
   assigning the calculated creative content interval to an independent play event timer object;
   simultaneously with said step of commanding, starting a timer by the independent play event timer object;
   and when the timer reaches the end of the calculated creative content interval, automatically commanding the second media player to start playing the second song,
   wherein the method further comprises storing a Boolean (True/False) Cold End Status data field for each song, and wherein the predetermined silence suffix interval is one of first and second predetermined silence suffix intervals; and
   if the Cold End Status data field for the first song is False, automatically subtracting the first predetermined silence suffix interval from the total measured duration interval of the first song to obtain the calculated creative content interval of the first song; if the Cold End status data field for the first song is True, automatically subtracting the second predetermined silence suffix interval from the total measured duration interval to obtain the calculated creative content interval of the first song.

2. The method of claim 1, further comprising the step of:
   loading, by a user, a playlist container containing attributes of each of a plurality of songs from a music library, the plurality of songs including the first and second songs.

3. The method of claim 2, wherein said at least one predetermined silence suffix interval is one of first and second predetermined silence suffix intervals is stored independently of any song or media player, the method further comprising the steps of:
   storing, by the playlist container and for each song, as one of the attributes of the song, the Boolean (True/False) Cold End Status data field;
   automatically retrieving the Cold End Status data field of the first song;
   wherein the first predetermined silence suffix interval is longer than the second predetermined silence suffix interval, the first predetermined silence suffix interval is applied to songs that end in a gradual level fade, and the second predetermined silence suffix interval is applied to songs that end abruptly.

4. The method of claim 2, further comprising the steps of:
   playing the first song by the first media player by retrieving, from the attributes of the first song stored in the playlist container, a hyperlink path to a corresponding storage media location where an audio file of the first song is stored; and
   playing the second song by the second media player by retrieving, from the attributes of the second song stored in the playlist container, a hyperlink path to a corresponding storage media location where an audio file of the second song is stored.

5. The method of claim 3, further comprising the steps of:
   automatically retrieving the Cold End Status data field for the second song;
   if the Cold End Status data field of the second song is False, subtracting the first predetermined silence suffix interval from the total measured duration interval of the second song to obtain a calculated creative content interval of the second song;
   if the Cold End Status data field of the second song is True, subtracting the second predetermined silence suffix interval from the total measured duration interval of the second song to obtain the calculated creative content interval of the second song;
   automatically assigning the calculated creative content interval of the second song to a timer interval property of the independent play event timer object; and
   playing the second song by the second media player until the timer interval property reaches the end of the calculated creative content interval of the second song.

6. The method of claim 5, further comprising the steps of:
   retrieving, from the playlist container, attributes of a third song, the attributes including a Boolean (True/False) Cold End Status data field of the third song;
   if the Cold End Status data field of the third song is False, subtracting the first predetermined silence suffix interval from the total measured duration interval of the third song to obtain a calculated creative content interval of the third song;
   if the Cold End Status data field for the third song is True, subtracting the second predetermined silence suffix interval from the total measured duration interval of the third song to obtain the calculated creative content interval of the third song;
   assigning the calculated creative content interval of the third song to a timer interval property of the independent play event timer object; and when the timer interval property reaches the end of the calculated creative content interval of the second song, automatically commanding the first media player to play the third song.

7. The method of claim 6, further including the steps of:

storing, in the playlist container, respective attributes of more than three songs; and sequentially and alternately playing, by the first and second media players, all of the songs having attributes stored in the playlist container until all of the songs have been played.

8. The method of claim 1, wherein no media file property is dependent on a property of any other media file, and wherein the content of the first and second songs are not compared to each other.

9. The method of claim 2, further comprising the steps of:

storing in the playlist container, for each song and as an attribute of the song, a Boolean (True/False) Auto Fade data field;

at the time that the second song is to be played by the second media player, retrieving the Auto Fade data field for the first song from the playlist container; and if the value of its retrieved Auto Fade data field is True, calculating and automatically applying a predetermined fade level reduction to the first song by the first media player, where the fade level reduction is commanded to start at a moment that coincides with the start of the second song in the second media player.

10. The method of claim 9, further comprising the steps of:

at the time a third, fourth, fifth or subsequent song is to be played by an alternating media player, retrieving the Auto Fade data field for the currently playing song from the playlist container; and if the value of its retrieved Auto Fade data field is True, calculating and automatically applying a predetermined fade level reduction to the currently playing song by its respective media player, where the fade level reduction is commanded to start at a moment that coincides with the start of said third, fourth, fifth or subsequent song in the alternating media player.

* * * * *